United States Patent

Meli et al.

[11] Patent Number: 6,025,954
[45] Date of Patent: Feb. 15, 2000

[54] AMPLIFIED TELECOMMUNICATION SYSTEM FOR WAVELENGTH-DIVISION MULTIPLEXING TRANSMISSIONS, HAVING AN EQUALIZED RECEPTION POWER

[75] Inventors: Fausto Meli, Piacenza; Stefano Piciaccia, Milan, both of Italy

[73] Assignee: Pirelli S.p.A., Milan, Italy

[21] Appl. No.: 09/188,466

[22] Filed: Nov. 9, 1998

Related U.S. Application Data

[63] Continuation of application No. 08/506,086, Jul. 24, 1995, Pat. No. 5,852,510.

[30] Foreign Application Priority Data

Jul. 25, 1994 [IT] Italy .................................. MI94A1573

[51] Int. Cl.⁷ .............................. H04J 14/02; H01S 3/00
[52] U.S. Cl. ............................................ 359/341; 359/124
[58] Field of Search .................................... 359/124, 125, 359/133, 341

[56] References Cited

U.S. PATENT DOCUMENTS

| | | | |
|---|---|---|---|
| 5,504,609 | 4/1996 | Alexander et al. | 359/125 |
| 5,715,076 | 2/1998 | Alexander et al. | 359/130 |
| 5,726,784 | 3/1998 | Alexander et al. | 359/125 |

OTHER PUBLICATIONS

IEICE Transactions of Communications, vol. E77–B, No. 4, Apr. 1994, Tokyo JP—pp. 449–453.
IEEE Photonics Technology Letters, vol. 6, No. 2, Feb. 1994, New York, U.S., pp. 266–269.
Journal of Optical Communications, vol. 14, No. 5, Oct. 1993, Berlin DE, pp. 179–182.
Database Inspec, IEE, London, GB, Lee et al.—Inspec. Nr. 4720970 & Proceedings IEEE Infocom '94 vol. 2, pp. 946–953 & Abstract.

*Primary Examiner*—Mark Hellner
*Attorney, Agent, or Firm*—Norris McLaughlin & Marcus; L. P. Brooks

[57] ABSTRACT

An optical telecommunication system including a transmitting station and a receiving station for optical signals, connected with each other by an optical fiber line including optical line amplifiers having a rare-earth-doped active fiber and connected in series, in which the transmitting station includes signal generator for generating signals at several wavelengths, and connections for conveying the signals to a single optical fiber line. The optical signal receiving station includes apparatus for separating the signals. At least one of the optical line amplifiers has dopants, fiber length and pumping power capable of determining, at the input of the receiving station, an optical signal/noise ratio which for the different wavelengths has a difference less than 2 dB, and for each signal is greater than 15 dB.

12 Claims, 15 Drawing Sheets

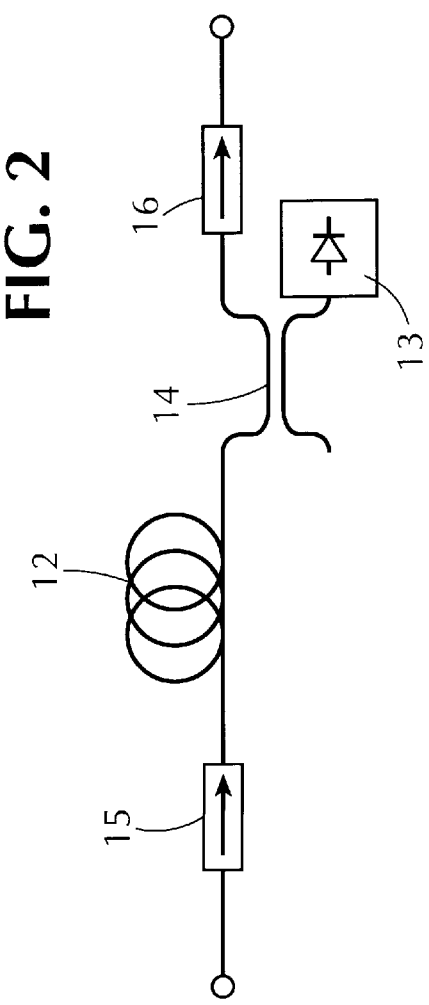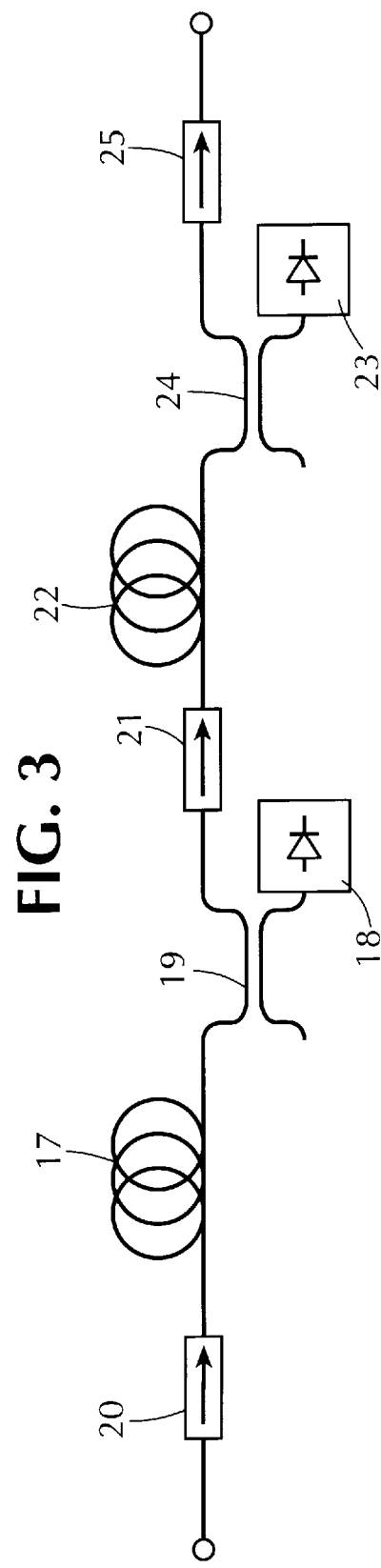

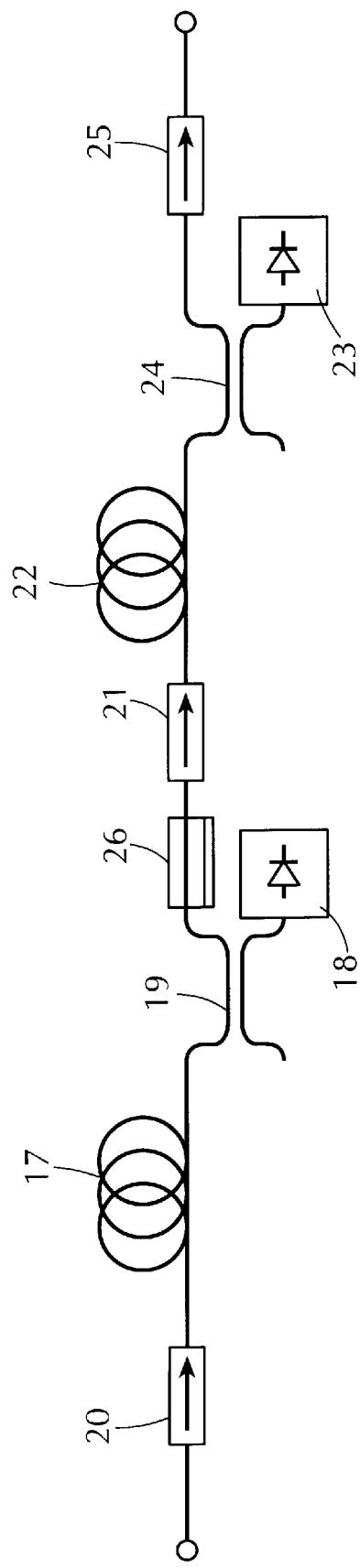
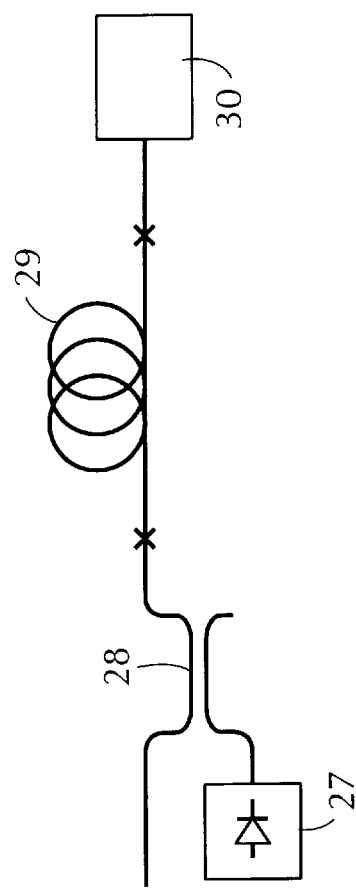
FIG. 4
FIG. 5

AMPLIFIED TELECOMMUNICATION SYSTEM FOR WAVELENGTH-DIVISION MULTIPLEXING TRANSMISSIONS, HAVING AN EQUALIZED RECEPTION POWER

This application is a continuation of applicstion Ser. No. 08/506,086 filed Jul. 24, 1995 now U.S. Pat. No. 5,852,510.

FIELD OF INVENTION

The present invention relates to a telecommunication system including optical amplifiers, particularly adapted for a wavelength-division multiplexing transmission (which in the following is referred to as "WDM transmission").

BACKGROUND

In a WDM transmission, several channels or transmission signals independent of each other are required to be sent over the same line consisting of an optical fibre, by multiplexing within the domain of the optical frequencies. The transmitted channels may be both digital and analog and are distinguishable from each other because each of them is associated with a specific frequency.

In such a transmission the different channels must be substantially equivalent to each other, that is none of them must be more or less privileged relative to the others, in terms of signal level or quality.

In the presence of amplifiers, in particular optical amplifiers, the amplifiers are required to substantially have the same response to all transmitted channels. In addition, in order to enable transmission of a high number of channels, the band in which the amplifier can operate is required to be wide.

Optical amplifiers are based on the properties of a fluorescent dopant, and in particular erbium, which is introduced as the dopant into an optical fibre core. In fact, erbium, excited by luminous pumping energy supply, exhibits a high emission in the wavelength range corresponding to the range of minimum light attenuation in silica-based optical fibres.

When an erbium-doped fibre, where erbium is maintained to an excited state, is passed through by a luminous signal having a wavelength corresponding to such a high emission, the signal causes transition of the excited erbium atoms to a lower level with a luminous emission stimulated to the wavelength of the signal itself, thereby generating a signal amplification.

Starting from the excited state, decay of the erbium atoms takes place also spontaneously, which generates a random emission constituting a "background noise", which overlaps the stimulated emission corresponding to the amplified signal.

The luminous emission generated by admitting luminous pumping energy to the "doped" or active fibre can occur at several wavelengths typical of the doping substance, thereby giving origin to a fluorescence spectrum in the fibre.

In order to achieve the greatest amplification of a signal by means of a fibre of the above type, together with a high signal/noise ratio suitable for a correct reception of the signal itself, in optical telecommunications, a signal is usually used which is generated by a laser emitter and has a wavelength corresponding to the maximum, in the intended band, of the fluorescence spectrum curve of the fibre incorporating the employed doping substance, or emission peak.

Erbium-doped fibres, on the other hand, have an emission spectrum with a peak of limited width, the features of which vary depending on the glass system into which erbium is introduced as the dopant, and a spectrum area of such a high intensity in a wavelength range contiguous to the above peak, within the wavelength range of interest, that the use of optical amplifiers for amplifying signals in a wide band is deemed to be possible.

Known erbium-doped fibres however, exhibit an uneven course of the emission spectrum. This uneven course affects the possibility of achieving a uniform amplification over the whole selected band.

In order to achieve a substantially "flat" gain curve, that is a gain as much constant as is possible at the different wavelengths, by eliminating noise sources due to a spontaneous emission, filtering elements may be used, such as those described for example in patents EP 426,222, EP 441,211, EP 417,441, filed in the name of the assignee of this application.

In such patents however, the amplifiers' behaviour in the presence of a wavelength division multiplexing is not described and, in addition, behaviour in the presence of several amplifiers connected with each other in cascade is not taken into account.

The emission spectrum profile greatly depends on the dopants present in the fibre core in order to increase the refractive index thereof, as shown for example in U.S. Pat. No. 5,282,079, in which the fluorescence spectrum of an alumina/erbium-doped fibre is shown to have a less marked peak and be at lower wavelengths than a germanium-erbium-doped fibre (which has a maximum at about 1532 nm). Such a fibre had a numerical aperture (NA) of 0.15.

In ECOC '93, ThC 12.1, pages 1–4, a fibre for an optical amplifier doped with Al and La and having a very low responsiveness to hydrogen is disclosed. The described Al-doped fibre has a numerical aperture (NA) of 0.16 and the Al—La-doped fibre has a numerical aperture (NA) of 0.30.

In ECOC '93, Tu 4, pages 181–184, optical amplifiers having erbium-doped fibres are disclosed. Experiments carried out with fibres the cores of which are doped with aluminium, aluminium/germanium and lanthanum/aluminium are described and the best results appear to be reached with Al/La-co-doped fibres.

In Electronics Letters, Jun. 6, 1991, vol. 27, No. 12, pages 1065–1067, it is pointed out that in optical amplifiers having an erbium-doped fibre, a co-doping with alumina enables a larger and flatter gain profile to be reached. The article describes amplifiers having an alumina-, germanium- and erbium-doped fibre as compared with amplifiers having a lanthanum-, germanium- and erbium-doped fibre. It is therein stated that the greatest gain flattening is obtained by the former.

In ECOC '91, TuPS1-3, pages 285–288 a fibre of the $AlO_3$—$SiO_2$ type doped with Er and La is described for the purpose of obtaining a higher refractive index and reducing the formation of clusters containing erbium ions. The fluorescence and absorption spectra of the Er/La-doped fibre proved to be very similar to those of an erbium-doped $Al_2O_3$—$SiO_2$ fibre. A numerical aperture (NA) of 0.31 was achieved as well as an erbium concentration of $23.10^{18}$ $cm^{-3}$.

In ECOC '89, Post-Deadline Papers, PDA-8, pages 33–36, Sep. 10–14, 1989, an experiment made with twelve optical amplifiers connected in cascade using an erbium-doped fibre is disclosed. A single signal wavelength of 1.536 $\mu$m was used and it is pointed out that signal wavelength control on the order of 0.01 nm is required for steady operation, in view of the fact that BER (Bit Error Rate) features rapidly decay on changing of the signal wavelength.

U.S. Pat. No. 5,117,303 discloses an optical transmission system comprising concatenated optical amplifiers that, based on the stated calculations, give a high signal/noise ratio, when operating in a saturated manner.

The described amplifiers have an erbium-doped fibre having an $Al_2O_3$—$SiO_2$ core and the use of filters is described. The calculated performance is achieved at a single wavelength and a feeding signal in a wide wavelength band offering the same performance is not described.

U.S. Pat. No. 5,111,334 describes a multi-stage amplifier, in which the fibres in each stage are different from each other as regards length, dopant or base material, in order to obtain a maximum gain in a wide wavelength range. Provision is made for the use of a great number of stages, corresponding to the different signal wavelengths, in order to obtain a low ripple response.

According to that patent, provision is not made for the possibility of achieving a flat gain in a wide wavelength band with signals simultaneously fed by a single-type fibre having the same wavelength of maximum gain with varying of the fibre length.

In this connection it is pointed out that the erbium-doped fibres exhibit a single wavelength of maximum gain, which is independent of the fibre length. In addition, in that patent the problem of carrying out transmission through several amplifiers in cascade is not dealt with.

In IEEE PHOTONICS TECHNOLOGY LETTERS, vol. 4, No. 8, August 1992, pages 920–922, A. R. Chraplyvy et al, an amplified WDM system is disclosed in which the gain equalization is accomplished by means of information given by telemetry. In this system, performance in terms of signal/noise ratio (SNR) is equalized by an iterative signal adjustment at the emission, based on the signals at the reception. The return information is given by telemetry.

In JOURNAL OF LIGHTWAVE TECHNOLOGY, vol. 8, No. 9, September 1990, M. Maeda et al, the effects of mixing between signals in a multi-wavelength system, which is due to the non-linear character of the optical single-mode fibres is described. Line amplifiers connected in cascade are not provided.

The U.S. Pat. No. 5,088,095 and ELECTRONICS LETTERS, Mar. 28, 1991, vol. 27, No. 7, by the same author, describe a gain control method in an erbium-doped-fibre amplifier in which the amplifier is located in a laser loop configuration, with a feedback of a wavelength different from that of the signal to be amplified.

The feedback loop is provided for use under the operating conditions of the amplifier and such an application is not related to design criteria of the amplifiers.

In U.S. Pat. No. 5,280,383, a two-stage amplifier is disclosed in which the first stage operates under small-signal conditions and the second stage operates under saturation conditions, thereby providing a gain compression. This provides a reduction in the required pumping power.

SUMMARY OF THE INVENTION

According to the present invention, it has been found that a communication can be implemented by a wavelength division multiplexing transmission at a high overall speed, through an amplified optical line, by arranging means in the transmitting and receiving stations for carrying out conversion of the external signals on several wavelengths and reconversion of the same signals so that they will exhibit features suitable for the receiver or receivers, in association with line amplifiers having structural and operating features adapted to provide uniform amplification conditions for the different channels.

In a general aspect, the present invention relates to an optical telecommunication system, comprising:

an optical-signal transmitting station;

a reception station for said optical signals; and an optical fibre line connecting said transmitting and receiving stations, said optical fibre line including at least two optical active-fibre line amplifiers doped with a rare earth material, connected in series and provided with pumping means for said active fibre.

The optical-signal transmitting station comprises generation means for generating transmission signals at at least two wavelengths included in a band of predetermined width and means for conveying said signals to a single optical-fibre line.

The optical-signal receiving station comprises separation means for separating said transmission signals from said single optical-fibre line.

At least one of said optical line amplifiers has dopants in the active fibre, a given length of active fibre and is provided a predetermined power by the pumping means, such that in combination they give rise, at the input of said receiving station, to an optical noise/signal ratio for said signals which, between signals of different wavelength, has a difference less than 2 dB and is greater than 15 dB for each one of said signals (over a band of 0.5 nm), when said signals are simultaneously transmitted in the presence of an overall optical power entering said optical line amplifiers which is at least equal to −16 dBm.

In a preferred embodiment, the multi-wavelength telecommunication system is characterized in that said transmitting station comprises:

reception means for receiving external optical signals at least into two independent channels, conversion means for converting said optical signals to an electronic form, generation means for generating transmission signals, at different wavelengths depending on the number of the independent channels of said external signals, which reproduce said external optical signals, and conveyor means for conveying said signals to a single optical-fibre line.

The receiving station comprises:

separation means for separating said transmission signals from said single optical-fibre line, conversion means for converting said received signals to an electronic form, and separation means for carrying out a separated emission of said received signals.

Preferably, said predetermined wavelength band is extended over at least 20 nm.

Preferably, said generation means for generating transmission signals comprises means for generating signals at least at four different wavelengths included in said predetermined wavelength band.

Preferentially, said signals are included between 1536 and 1555 nm.

In a preferred embodiment, at least one of said optical amplifiers has an active fibre of an overall length less by a predetermined value than the maximum-gain length for the pump power fed by the pumping means connected therewith.

More preferentially, said fibre length is such that, when the amplifier is connected in a loop in which at least one outgoing signal portion is inputted to the amplifier, the emission from the amplifier exhibits two stable emission peaks at two different wavelengths included in said band, at a predetermined power of said outgoing signal correlated with the amplifier work power.

In particular, said generation means for generating transmission signals comprises, for each of said transmission signals, a continuous-emission laser associated with an external modulator. In turn, said conveyor means for conveying said signals to a single optical-fibre line comprises respective optical couplers which are wavelength-selective.

In addition and in particular, said separation means for separating said transmission signals from said single optical-fibre line of said optical-signal receiving station comprises a corresponding fibre divider and a bandpass filter for each one of the wavelengths of said transmission signals.

Preferably, said rare earth-doped optical line amplifiers comprise at least one erbium-doped active fibre.

More preferentially, said active fibre comprises lanthanum, germanum and alumina as index-modifying dopants.

According to another aspect, the present invention relates to an optical fibre amplifier comprising:
 a rare-earth-doped active fibre, adapted to generate a light emission in a signal wavelength range, in response to a luminous supply at a pumping wavelength,
 pumping means for said active fibre, having an optical power of a predetermined value at said pumping wavelength.

The active fibre has such a length that, when a signal portion from said active fibre is fed to the input of the active fibre itself, in the presence of a luminous pumping supply, a stable emission at two different wavelengths in said signal wavelength range occurs, at a predetermined overall optical power of said outgoing signal.

In particular, said predetermined power is correlated with the amplifier work power.

In one embodiment, the optical fibre amplifier according to the present invention comprises a single amplification stage.

Alternatively, the optical fibre amplifier according to the present invention comprises at least two amplification stages connected in series, each of which is provided with a respective active fibre stretch and pumping means, and is characterized in that said active fibre length is the sum of the lengths of said active fibre stretches, and said optical pumping power of predetermined value is the sum of the optical powers fed by said pumping means to the respective active fibre stretches.

In this case, in particular, said active fibre length is the fibre length of at least one stage, determined on the basis of the pumping power fed to the stage itself.

According to a further aspect, the present invention relates to a method of determining the optimal active fibre length in an optical amplifier, in particular for operation in cascade in a multi-wavelength system, characterized in that it comprises the steps of:
 arranging an optical amplifier having an input and an exit for an optical signal, and comprising a rare earth-doped active fibre and pumping means for said active fibre, to receive a predetermined pumping power;
 optically connecting the exit of said amplifier to the input thereof;
 supplying said active fibre with luminous pumping energy, from said pumping means, causing a light emission in said active fibre constituting an emission signal from the amplifier;
 controlling the spectrum and optical power of said emission signal; and
 selecting a length of said active fibre at which said spectrum exhibits two stable emission peaks at two different wavelengths in a predetermined wavelength range, at a predetermined power of said emission signal.

Preferentially, according to the above method, it is provided that between the optically connected exit and input of said amplifier, an optical attenuating means having an adjustable attenuation be interposed, said attenuating means being adjusted so as to cause such an attenuation of said emission signal, between the exit and input of said amplifier, that the power of said emission signal is equal to said predetermined value.

In particular, said predetermined power value of said emission signal is correlated with the provided work power of the amplifier.

In particular, the method according to the invention, in the case in which said amplifier is a two-stage or multi-stage amplifier, is characterized in that the fibre length of at least one of said stages is selected.

Preferentially, in the case in which said amplifier is a two-stage or multi-stage amplifier, the method according to the present invention is characterized in that it comprises the steps of:
 arranging the amplifier so that the active fibre length of at least one stage is selected at a maximum gain for the pumping power applied thereto;
 connecting the exit of the amplifier with the input thereof;
 controlling the spectrum and optical power of the emission signal of said amplifier in the presence of respective pumping powers fed to each of said stages; and
 selecting an active fibre length of at least one of the amplifier stages at which said spectrum exhibits two stable emission peaks at two different wavelengths in a predetermined wavelength range, at a predetermined power of said emission signal.

More preferentially, the active fibre length of the amplifier end stage alone is selected.

Alternatively, in the method according to the invention it is provided that, in the presence of particular application requirements, said selection of the active fibre length be individually carried out for all stages, each of them being tested separately.

BRIEF DESCRIPTION OF THE DRAWINGS

More details will appear from the following description, with reference to the accompanying drawings, in which:

FIG. 2 shows an optical line amplifier for use in the system of FIG. 1, according to a first embodiment;

FIG. 3 shows an optical line amplifier for use in the system of FIG. 1, according to a second embodiment;

FIG. 4 shows an optical amplifier provided with a two-core filter;

FIG. 5 shows an experimental configuration for determining the spectral emission of erbium-doped optical fibres, for use in optical amplifiers;

DETAILED DESCRIPTION

Figure 1:
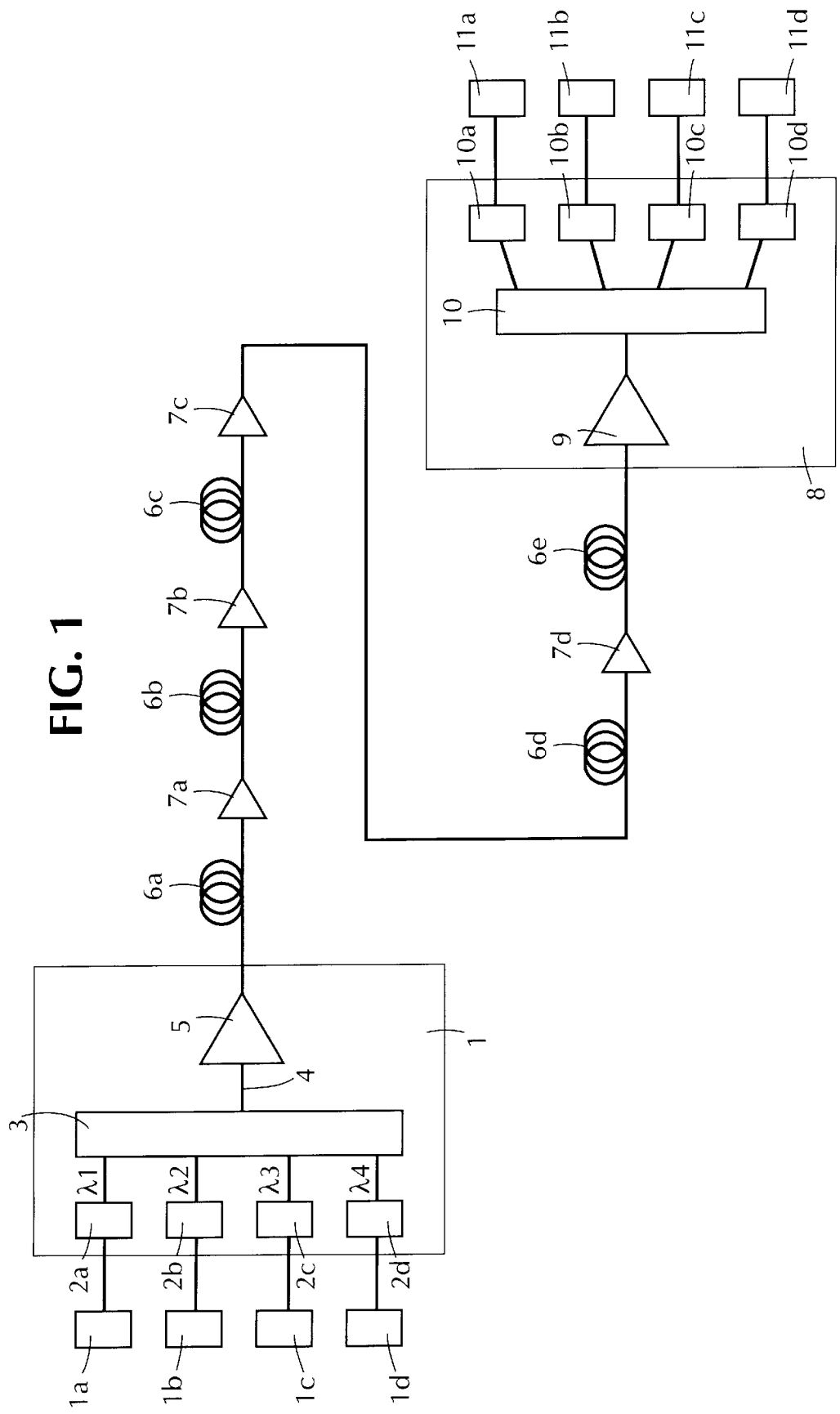
FIG. 1 is a diagram of a multi-wavelength telecommunication system according to the present invention.

As shown in FIG. 1, an optical wavelength-multiplexing multi-channel telecommunication system according to the present invention is provided with several (four in the example shown) optical origin signal sources 1a, 1b, 1c, 1d, each of which generates a signal, referred to as "external signal", possessing its own transmission features, such as wavelength, modulation type, power. Signals generated by such sources are fed to a transmitting station 1, each of them being sent to a respective interfacing unit 2a, 2b, 2c, 2d, which is adapted to receive the external optical origin signals, detect them and newly regenerate them with new features adapted to the transmitting system.

In particular, said interfacing units generate respective optical signals of wavelengths included in the useful work band of amplifiers disposed in succession in the system.

In U.S. Pat. No. 5,267,073, filed in the name of the assignee of this application, the description of which is herein incorporated by reference, interfacing units are described which in particular comprise a transmitting adapter, designed to convert an optical input signal to a form adapted to the optical transmission line, and a receiving adapter, designed to reconvert the transmitted signal to a form suitable for a receiving unit.

For use in the system of the present invention, the transmitting adapter preferably comprises a laser of the external modulation type as the laser for generating an output signal.

Figure 29:
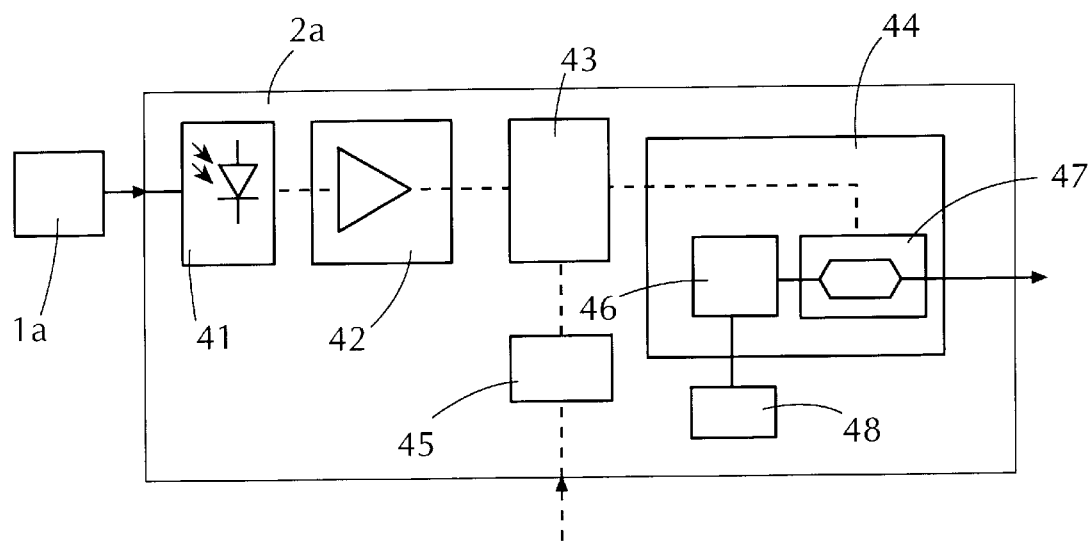
FIG. 29 is a diagram of an interfacing unit, from the transmitting side.

A diagram of an interfacing unit for transmission, of a type adapted for use in the present invention, is shown in FIG. 29, in which, for the sake of clarity, the optical connections are represented in solid lines, whereas the connections of the electric type are represented in dotted lines.

The optical signal from one of the sources 1a, 1b, 1c, 1d, source 1a for example as shown, is received by a photodetector (photodiode) 41, which emits an electric signal which is fed to an electronic amplifier 42.

The electric output signal from the amplifier 42 is fed to a piloting circuit 43 of a modulated laser emitter, generally identified by 44, which is adapted to generate an optical signal at the selected wavelength containing the input signal information.

Conveniently, an admitting circuit 45 of a service channel is also connected to the piloting circuit 43.

The modulated laser emitter 44 comprises a laser 46 and an external modulator 47, of the Mach-Zender type for example, piloted by the output signal from circuit 43.

A circuit 48 controls the emission wavelength of laser 46, keeping it constant to the previously selected value and compensating for possible external disturbances, such as temperature and the like.

Interfacing units of the above type, for reception, are described in the above mentioned patent and marketed by the assignee of the application under the trade name TXT/E-EM.

Said optical work signals are therefore fed to a signal combiner 3, adapted to simultaneously send, in a single optical output fibre 4, the work signals at their wavelengths.

In general, the signal combiner 3 is a passive optical device by which the optical signals transmitted over respective optical fibres are superposed in a single fibre. Devices of this type consist for example of fused-fibre couplers, in planar optics, microoptics and the like.

By way of example, an appropriate combiner is a 1×4 SMTC-0104-1550-A-H type available from E-TEK DYNAMICS INC., 1885 Lundy Ave, San Jose, Calif. (USA).

Through fibre 4 said work signals, in the following referred to as S1, S2, S3, S4, are sent to a power amplifier 5 which raises the levels thereof until they reach a value sufficient to enable them to travel over the subsequent optical fibre portion existing before the presence of new amplification means, which keeps a sufficient power level at the end for ensuring the required transmissive quality.

Therefore a first portion 6a of optical line is connected to the power amplifier 5. The first portion 6a is usually made of a single-mode optical fibre of a step-index type, which is inserted in an appropriate optical cable which is some ten (or hundred) kilometers long, for example about 100 kilometers long.

Although in some cases optical fibres of the dispersion shifted type may be also used, for connections of the above type fibres of the step-index type are generally preferable due to the fact that, in shifted dispersion fibres, the possible occurrence of non-linear intermodulation effects between close channels has been found. These effects are large if the distance between the channels is very small.

At the end of said first portion 6a of optical line, a first line amplifier 7a is present which is adapted to receive the signals attenuated during their travel over the fibre and amplify them to a sufficient level for feeding them to a second optical fibre portion 6b having the same features as the preceding one.

Subsequent line amplifiers 7b, 7c, 7d and respective optical fibre portions 6c, 6d, 6e cover the required overall transmission distance until a receiving station 8 is reached, which station comprises a pre-amplifier 9 adapted to receive the signals and amplify them, compensating for the loss resulting from the subsequent demultiplexing apparatuses, until a power level suitable for the sensitivity of the receiving devices is reached.

From the preamplifier 9, signals are sent to a demultiplexer 10, through which the same signals are separated depending on the respective wavelengths, and then sent to the interfacing units 10a, 10b, 10c, 10d, adapted to receive the optical signals having features suitable for the transmission system and to regenerate them with the original optical features, or other features, which, in any event, are adapted to the respective receiving apparatus 11a, 11b, 11c, 11d.

The demultiplexer 10 is a device adapted to distribute among several output fibres the optical signals fed to an input fibre, separating them depending on the respective wavelengths. Such a demultiplexer may consist of a fused-fibre splitter, which divides the input signal into signals on several output fibres, in particular four fibres, each of said signals being fed to a respective band-pass filter centered on each of the wavelengths of interest. For example, a component similar to the already described signal combiner 3 may be used, being mounted in an inverted configuration in combination with respective band-pass filters. Band-pass filters of the above type are available for example from MICRON-OPTICS, INC., 2801 Buford Hwy, Suite 140, Atlanta, Ga., USA. FFP-IOO is an appropriate model thereof.

The described configuration in particular gives satisfactory results when transmissions over about 500 km distances at a high transmission speed, such as 2.5 Gbit/s, are concerned (with four multiplexed wavelengths, a transmission capability corresponding to 10 Gbit/s on each individual wavelength is obtained), making use of four line amplifiers, a power amplifier and a pre-amplifier. To the ends of the present invention and for the above use, the power amplifier 5 is for example an optical fibre amplifier of a commercial type, having the following features:

| input power | −5 to +2 dBm |
| output power | 13 dBm |
| work wavelength | 1530–1560 nm. |

The power amplifier is devoid of a notch filter.

An appropriate model is TPA/E-12, commercialized by said assignee. Said power amplifier uses an erbium-doped active optical fibre, of the Al/Ge/Er type.

By "power amplifier", it is intended an amplifier operating under saturation conditions, in which the output power depends on the pumping power, as described in detail in the European Patent EP-439,867 herein incorporated by reference.

To the ends of the present invention and for the above use, by "pre-amplifier" it is intended an amplifier put at the end of the line, capable of raising the signal to be fed to the receiver to a value conveniently higher than the sensitivity threshold of the receiver itself (for example from −26 to −11 dBm at the receiver input), while at the same time introducing the lowest possible noise and maintaining the signal equalization.

In the experiment described, for making the pre-amplifier 9, a one-stage line amplifier using the same active fibre as amplifiers 7a–7c, described in the following, was used and it was mounted in a co-propagating configuration. For particular practical implementations, a pre-amplifier expressly designed for the particular purpose can be adopted.

The configuration of the above described transmission system is particularly adapted to provide the desired performance, especially for wavelength-multiplexing transmission over several channels, in the presence of a particular selection of the properties of the line amplifiers being part thereof and with particular regard for the capability of transmitting the selected wavelengths without some of them being penalized with respect to the others.

In particular, an even behaviour for all channels can be ensured, at wavelengths between 1530 and 1560 nm, in the presence of amplifiers adapted to operate in cascade by making use of line amplifiers capable of giving a substantially uniform (or "flat") response at the different wavelengths, when operating in cascade.

b) Line amplifier

For the above purpose, an amplifier intended for use as a line amplifier can be made following the diagram shown in FIG. 2. It comprises an erbium-doped active fibre 12 and a respective pump laser 13 connected thereto through a dichroic coupler 14. A first optical isolator 15 is placed upstream of the fibre 12, following the travel path of the signal to be amplified, whereas a second optical isolator 16 is placed downstream of the active fibre itself.

For use as a line amplifier, conveniently, as shown (although not necessarily) the dichroic coupler 14 is disposed downstream of the active fibre 12 so as to supply it with pumping energy counter-current to the signal.

In a particular embodiment, as shown in FIG. 3, the line amplifier can be made according to a two-stage configuration, based on the specific use requirements, as described and illustrated in the following.

In such an embodiment, the line amplifier comprises a first erbium-doped active fibre 17, and a respective pump laser 18 connected thereto through a dichroic coupler 19. A first optical isolator 20 is placed upstream of the fibre 17 following the travel path of the signal to be amplified, whereas a second optical isolator 21 is placed downstream of the active fibre itself.

Conveniently, as shown (although not necessarily), in this configuration too, the pump laser 18 is connected so as to supply pumping energy counter-current to the signal.

The amplifier further comprises a second erbium-doped active fibre 22 associated with a respective pump laser 23 through a dichroic coupler 24, also connected for counter-current pumping in the example shown. Then, downstream of the fibre 22, there is another optical isolator 25.

The pump lasers 13, 18, or 23, preferably are lasers of the Quantum Well type, having the following features:

emission wavelength $\lambda_p$=980 nm;

maximum optical output power $P_u$=80 mW (for a two-stage embodiment). Lasers of the above type are for example produced by:

LASERTRON INC., 37 North Avenue, Burlington, Mass. (USA).

The dichroic couplers 14, 19, or 24 are fused-fibre couplers, made of single-mode fibres at a wavelength of 980 nm, which is within the wavelengths between 1530 and 1560 nm have a variation of <0.2 dB in the optical output power, depending on polarization.

Dichroic couplers of the above type are known and available and are produced, for example, by GOULD Inc., Fibre Optic Division, Baymeadow Drive, Glem Burnie, M. D. (USA), and by SIFAM Ltd., Fibre Optic Division, Woodland Road Torquay Devon, (GB).

The optical isolators 15, 16, 20, 21, or 25 are optical isolators of a type independent of the polarization of the transmission signal, and have an isolation greater than 35 dB and a reflectivity lower than −50 dB.

The isolators used are model MDL I-15 PIPT-A S/N 1016 available from ISOWAVE, 64 Harding Avenue, Dover, N.J., USA.

In the described system, the line amplifiers are provided for operation at an overall optical output power of about 14 dBm, with a gain of about 30 dB.

b1) Amplifier with a two-Core filter (comparison)

A different amplifier embodiment for use as a line amplifier is shown in the diagram in FIG. 4, wherein corresponding elements have been allocated the same reference numerals as in FIG. 3.

In this amplifier, the components of which have the same features as above described, a notch filter 26 is present. The filter 26 consists of an optical fibre portion having two cores optically coupled to each other at a preselected wavelength, one of them being coaxial with the connected optical fibres and the other being offset and cut-off at the ends, as described in patents EP 441,211 and EP 417,441, the description of which is herein incorporated by reference.

Said filter is sized such that it couples, in the offset core, a wavelength (or wavelength band) corresponding to one portion of the emission spectrum of the amplifier. The offset core is cut off at the ends to enable the wavelength transferred thereinto to be dispersed in the fibre cladding, so that it is no longer coupled again in the main core.

In the embodiment shown, the two-core filter 26 had the following features:

| | |
|---|---|
| wavelength band coupled in the second core BW (−3 dB) | ≈8–10 nm |
| filter length | 35 mm |

The filter was designed in order to have the maximum attenuation at the emission peak of the employed active fibre and aimed to make the gain curve of the individually employed amplifier flat.

In the examples hereinafter described filters having the following values were alternatively used:

| | | |
|---|---|---|
| | attenuation at $\lambda_s$ 1530 nm | 5 dB or |
| | attenuation at $\lambda_s$ 1532 nm | 11 dB. | c) Active fibre description

Different types of erbium-doped active fibres were made for use in the above described amplifiers, as detailed in the Italian Patent Application n° M194A 000712 of Apr. 14, 1994 in the name of the assignee, herein incorporated by reference and the contents of which are hereinafter summarized.

Analyses of the compositions were made on a preform (before drawing of the fibre) by a microprobe combined with a scanning electron microscope (SEM Hitachi).

Analyses were conducted at 1300 times magnification on discrete points disposed along a diameter and separated from each other by 200 μm.

The stated fibres were made following the technique of the vacuum plating within a quartz glass tube.

In the stated fibres, the incorporation of germanium as the dopant into the $SiO_2$ matrix in the fibre core is obtained during the synthesis step.

The incorporation of erbium, alumina and lanthanum into the fibre core was obtained by the "solution doping" technique, in which an aqueous solution of the dopant chlorides is put into contact with the synthesis material of the fibre core, while it is in a particulate state, before hardening of the preform.

More details on the solution doping technique can be found for example in U.S. Pat. No. 5,282,078, which is herein incorporated by reference.

c1) Experimental tests on active fibres

Figure 6:
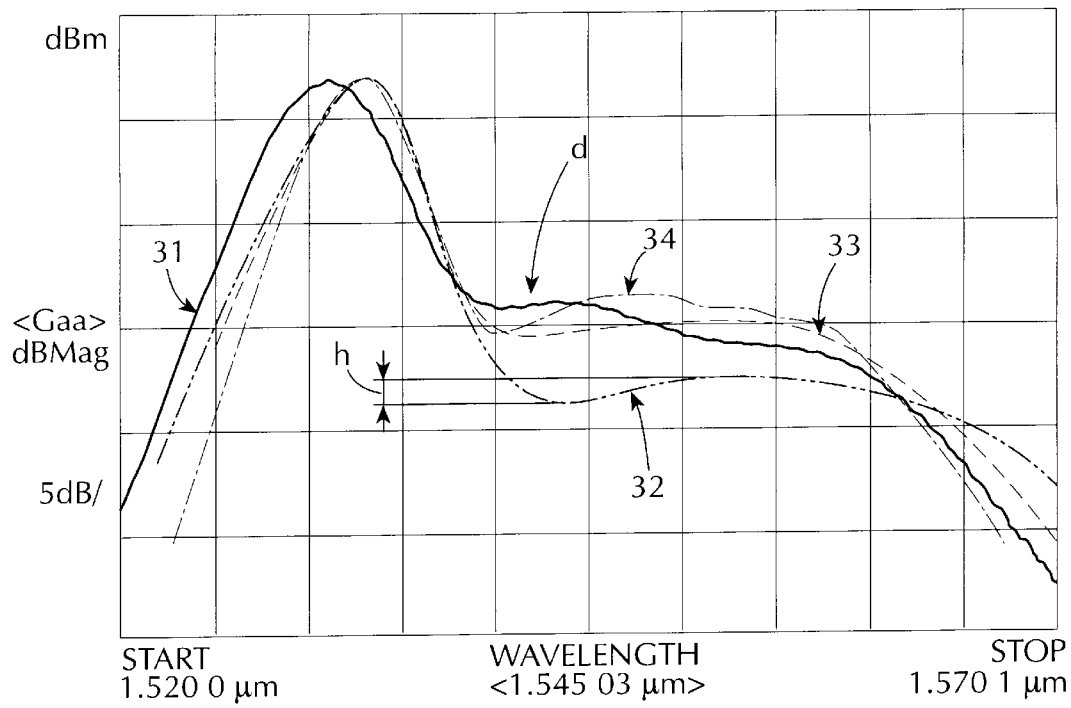
FIG. 6 shows the spectral-emission graphs of the fibres compared with one another.

The experimental configuration adopted for determining the spectral emission in the considered fibres is diagrammatically shown in FIG. 5, whereas FIG. 6 shows graphs reproducing the measured spectral emission on the active fibres A, B, C, D. A pump laser diode 27, at 980 nm, was connected through a dichroic coupler 980/1550, identified by 28, to the active fibre 29 being tested. The fibre emission was detected through an optical-spectrum analyzer 30.

The laser diode had a power of about 60 mW (in the fibre 29). The active fibre 29 was about 11 m long.

For different erbium contents in the fibres and different available pump power, an appropriate length for measurement purposes can be experimentally determined by trying different fibre lengths in order to maximize the output signal power.

The optical spectrum analyzer was a model TQ8345 produced by ADVANTEST CORPORATION, Shinjuku -NS Bldg, 2-4-1 Nishi-Shinjuku, Shinjuku-ku, Tokyo (JP).

Measuring was executed by keeping the fibre pumped to 980 nm and detecting the spontaneous emission spectrum of the fibre.

The achieved results are shown in FIG. 6 where curve 31 corresponds to fibre A, curve 32 corresponds to fibre B, curve 33 corresponds to fibre C and curve 34 corresponds to fibre D.

As can be seen from the graphs, the spectral emission of fibres B, C, D has a main peak of great intensity with a maximum at about 1532.5 nm and a subsequent area of high emission at higher wavelengths, until approximately 1560–1565 nm, a very enlarged secondary peak being included.

TABLE 1

| Fibre | $Al_2O_3$ wt % | (mol %) | $GeO_2$ wt % | (mol %) | $La_2O_3$ wt % | (mol %) | $Er_2O_3$ wt % | (mol %) | NA | $\lambda_c$ nm |
|---|---|---|---|---|---|---|---|---|---|---|
| A | 4 | (2.6) | 18 | (11.4) | 1 | (0.2) | 0.2 | (0.03) | 0.219 | 911 |
| B | 1.65 | (1.1) | 22.5 | (14.3) | 0 | (0) | 0.2 | (0.03) | 0.19 | 900 |
| C | 4 | (2.6) | 18 | (11.4) | 0 | (0) | 0.2 | (0.03) | 10.20 | 1025 |
| D | 4 | (2.6) | 0 | (0) | 3.5 | (0.7) | 0.2 | (0.03) | 0.19 | 900 | wherein:
wt % = (average) percent content by weight of oxide in the core
mol % = (average) percent content by mole of oxide in the core
NA = Numerical Aperture $(n1^2 - n^2)^{1/2}$
$\lambda_c$ = cut-off wavelength (LP11 cut-off).

A comparison between curves 32 and 33 (fibres B and C, respectively) shows that a greater alumina content in the fibre raises the level of said high-emission area. The replacement of germanium by lanthanum (fibre D, curve 34) enables a still higher level to be achieved in the 1535–1560 nm range.

On the other hand, in all fibres B, C, and D the presence of a depression was observed in a zone d in the spectrum (localized between about 1535 and 1540 nm) between the main emission peak and contiguous thereto, and the secondary emission peak. In such a depression, the emission value is lower by at least 2 dB than the maximum emission value in the adjacent areas (that is both the main peak and secondary peak), as shown in FIG. 6 by reference h for curve 32 alone, but clearly identifiable for curves 33, 34 too.

Curve 31, on the contrary, shows that under the experimental conditions shown, fibre A in zone d does not show an important depression in the spectrum (or, where a depression is detectable, it is at all points lower than about 0.5 dB).

Curve 31 also shows that the maximum-emission peak in fibre A is at lower wavelengths than in fibres B, C, and D, being localized at about 1530 nm, and that the fibre A keeps a high emission level until close to 1520 nm.

d) Multi-wavelength transmission tests

Using fibre A, amplifiers of the structure shown in FIG. 3 were made, for use as line amplifiers in a telecommunication system as depicted in FIG. 1, by adopting different fibre lengths (experiments 1, 2). For comparison purposes, amplifiers made with fibre C, in combination with a filter (structure of FIG. 3) were tried out.

In the experiments, the first active fibre 17 was about 8 m long. For the second active fibre 22, the lengths reproduced in the following table were tested.

| Experiment | Amplifier scheme | Fibre length | Fibre type |
|---|---|---|---|
| 1 | FIG. 3 | about 11 m | A |
| 2 | FIG. 3 | about 15 m | A |
| 3 | FIG. 4 | about 13 m | C |

For experiments 2 and 3, the overall active fibre length was determined by finding out the optimal value for a single amplifier, according to steps 1, 2 of the methods described below. For experiment 1 the fibre length of the line amplifiers was determined according to steps 1, 2 and 3 of the methods described in the following.

Figure 7:
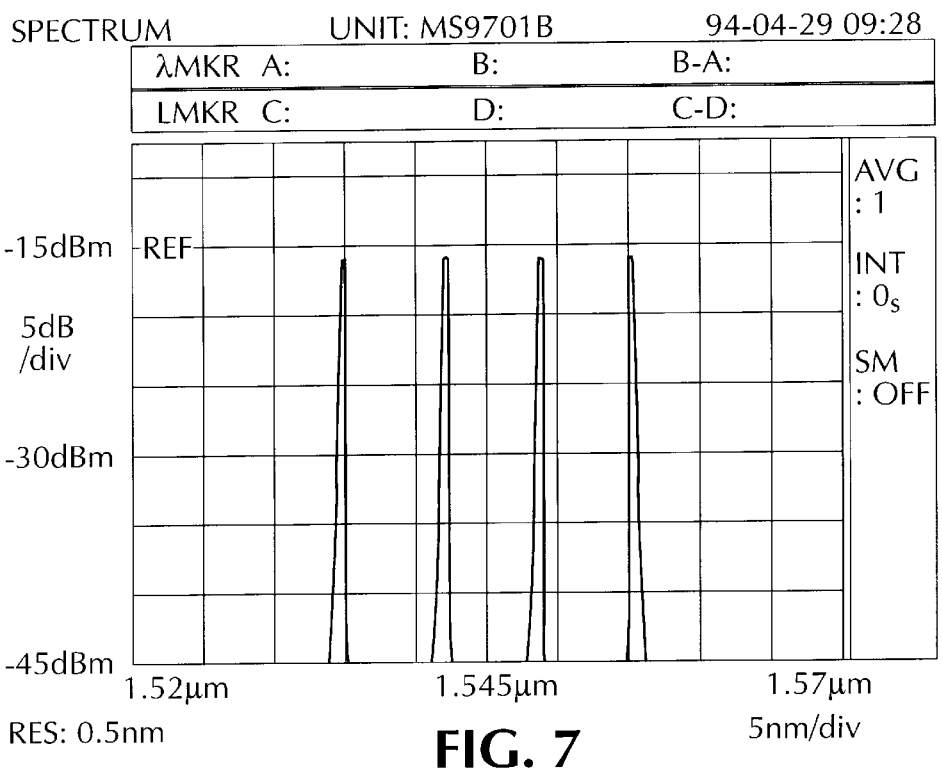
FIG. 7 shows the power levels of the signals fed to the booster input in the experiments carried out using a telecommunication system according to the diagram in FIG. 1.
Figure 8:
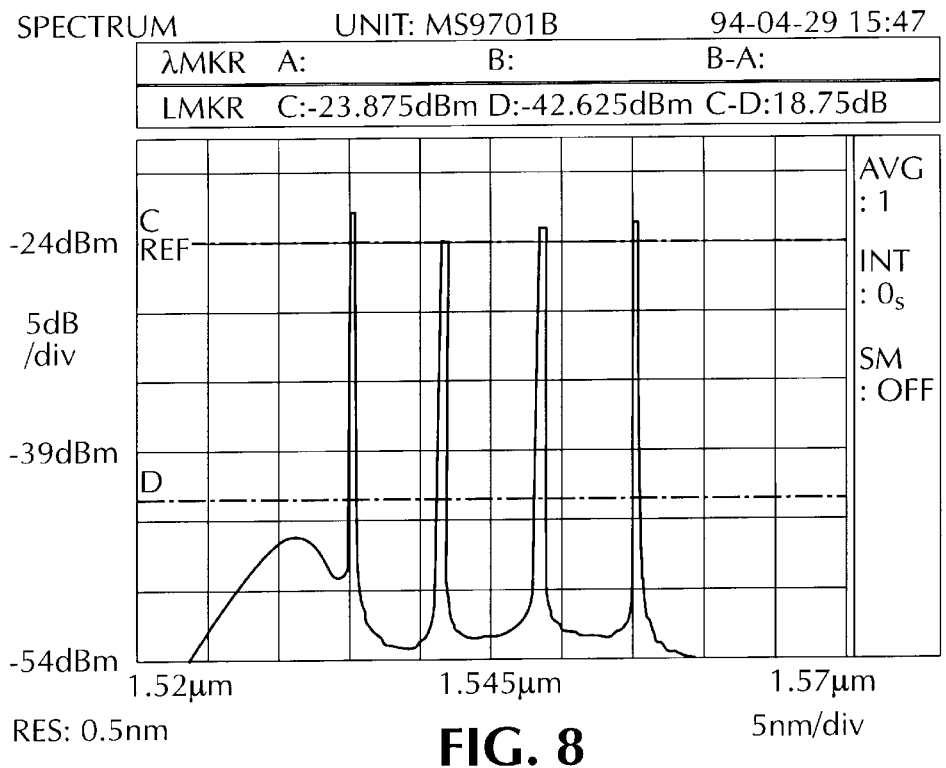
FIGS. 8 to 13 show the signal power levels in the subsequent amplification stages in an experiment in which amplifiers according to the invention are used.
Figure 9:
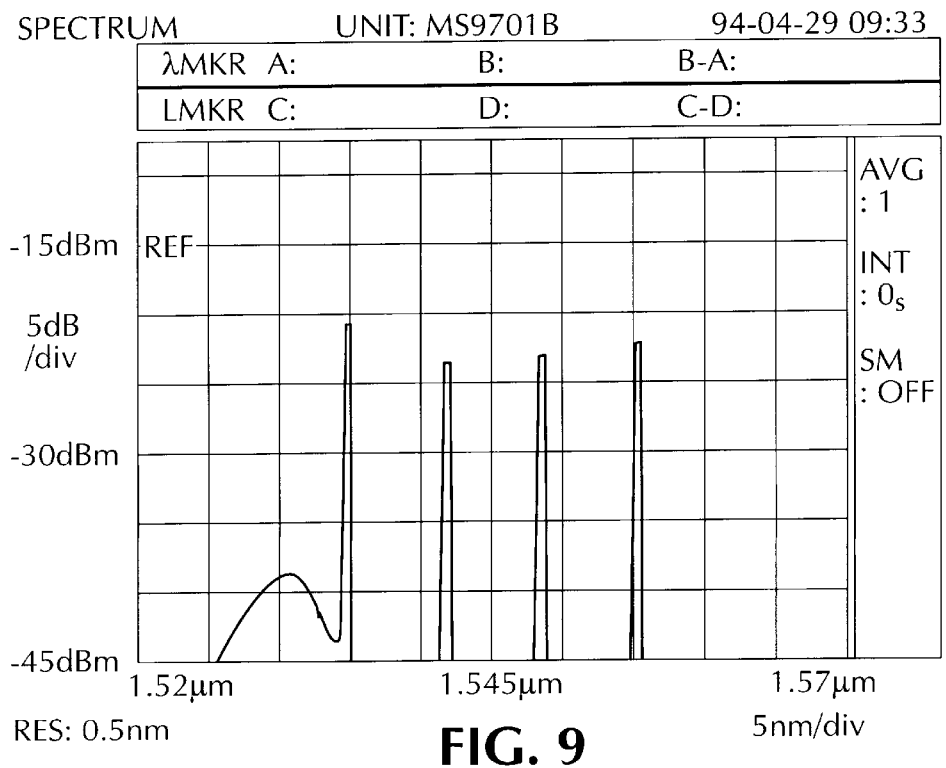
Figure 10:
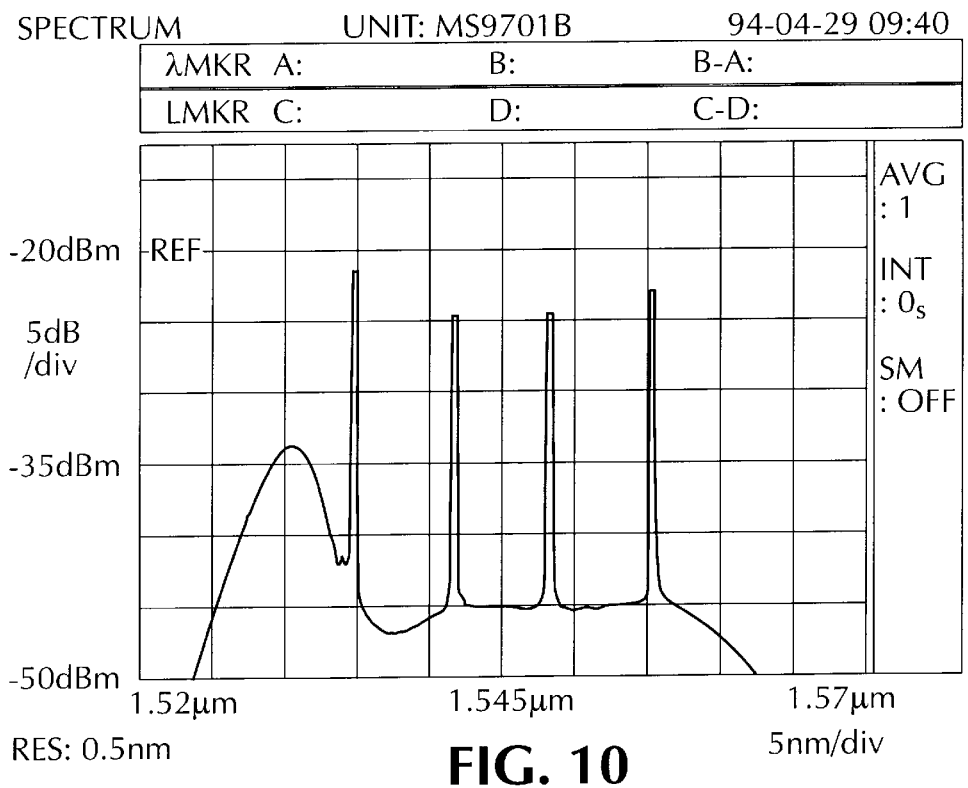
Figure 11:
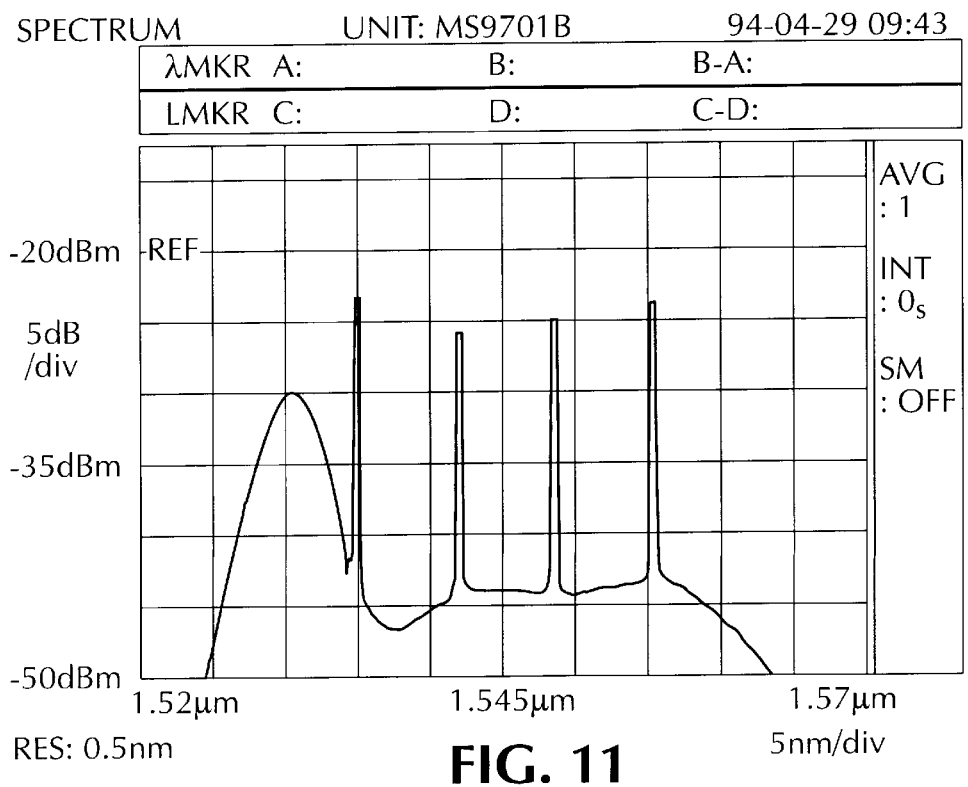
Figure 12:
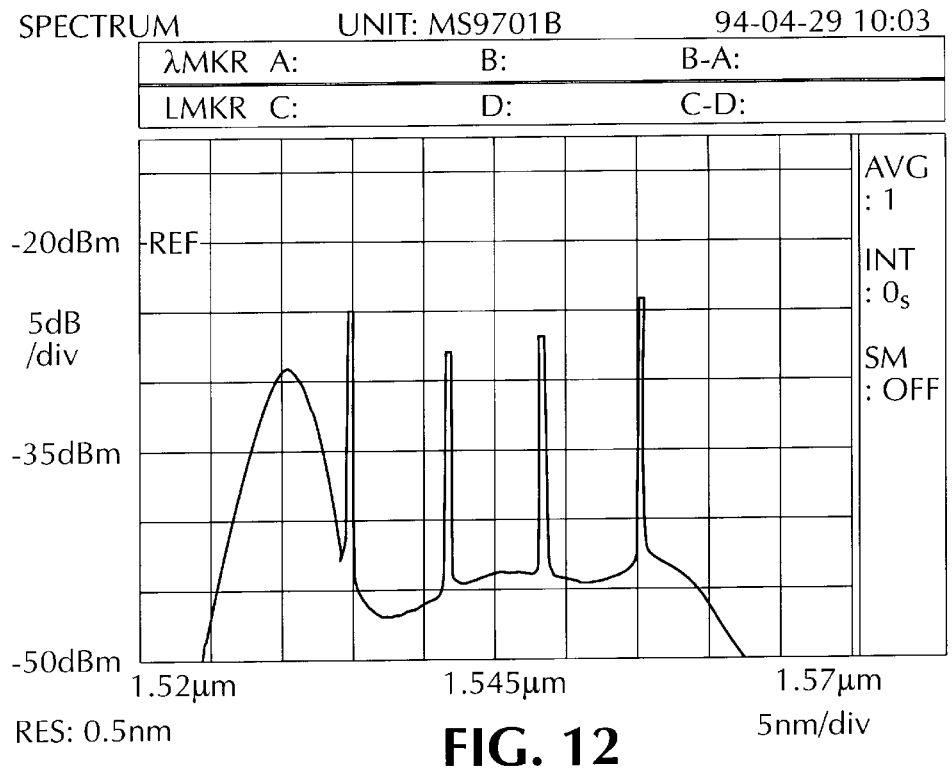

The spectrum of the signals fed to the input of the power amplifier 5 in the three experiments carried out, is shown in FIG. 7.

EXPERIMENT 1

Figure 13:
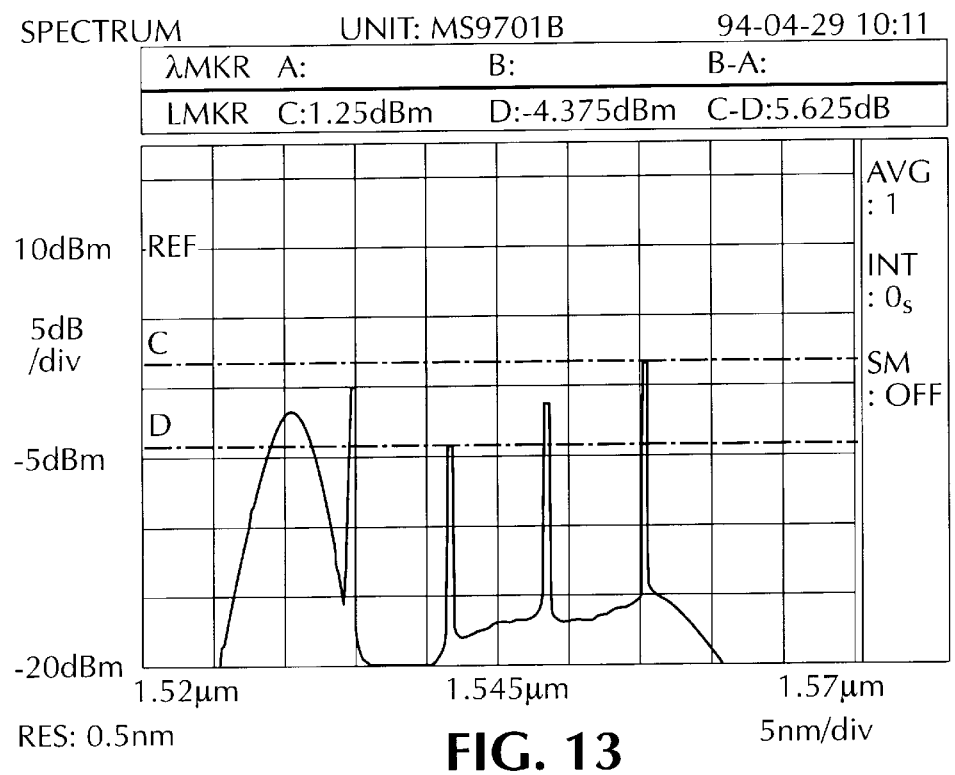

FIGS. 8, 9, 10, 11, 12 and 13 respectively show the signal spectrum at line amplifier 7a input (FIG. 8), at the line amplifier 7b input (FIG. 9), at the line amplifier 7c input (FIG. 10), at the line amplifier 7d input (FIG. 11), at the preamplifier 9 input (FIG. 12) and at the preamplifier 9 output (FIG. 13).

The optical signal/noise ratios for the different channels (over an optical band of 0.5 nm of the filter of the spectrum analyser) were measured at the preamplifier input. The results are as follows:

| Wavelength nm | Signal/noise ratio (SNR) dB |
|---|---|
| $\lambda_1$ | 18.2 |
| $\lambda_2$ | 16.3 |
| $\lambda_3$ | 16.9 |
| $\lambda_4$ | 18.1 |

It will be noted that signal/noise ratios appear to differ less than 2 dB between the different channels and, in addition, they have very high values. It should be observed that a signal/noise ratio of 13–14 dB is already sufficient to provide an error level (BER) of $10^{-12}$ (a reference value usually adopted for comparing the transmission systems).

EXPERIMENT 2

Figure 14:
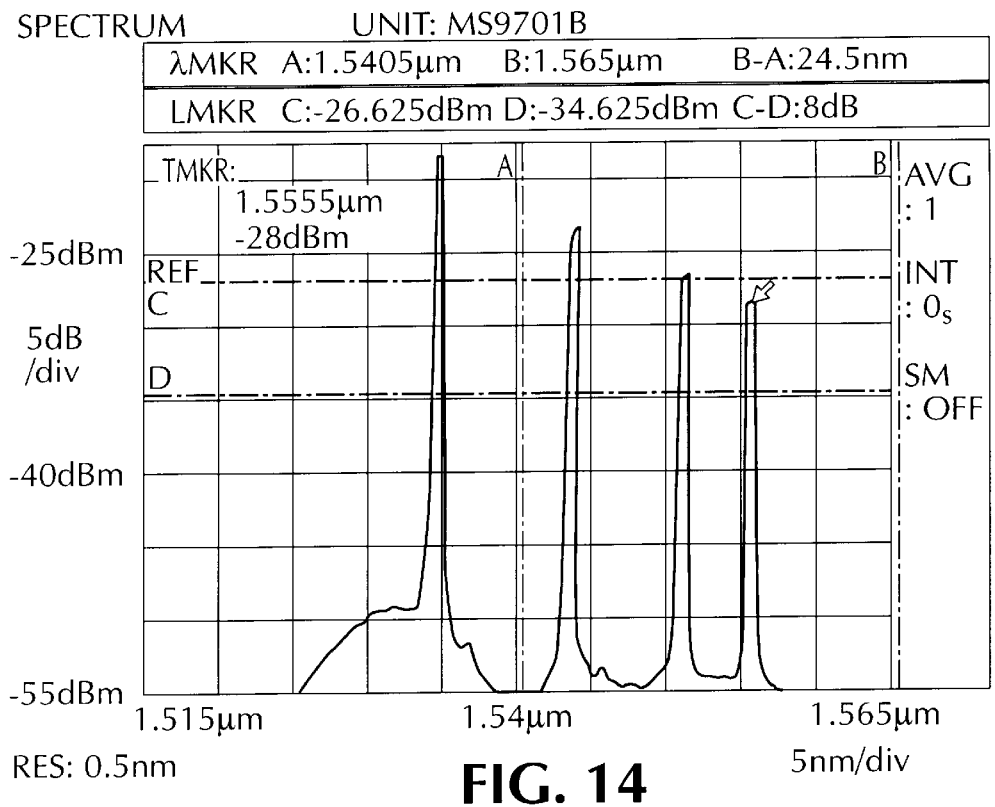
FIGS. 14 to 18 show the signal power levels in the subsequent amplification stages in an experiment in which use is made of amplifiers according to the invention with an active fibre having a non-optimal length and pre-equalization.

Experiment 2 was conducted by applying a pre-equalization to the signals through respective attenuators not shown in FIG. 1 (the second-stage fibre being not optimized in length), and the spectrum shown in FIG. 14 was obtained at the line amplifier 7a input.

Figure 15:
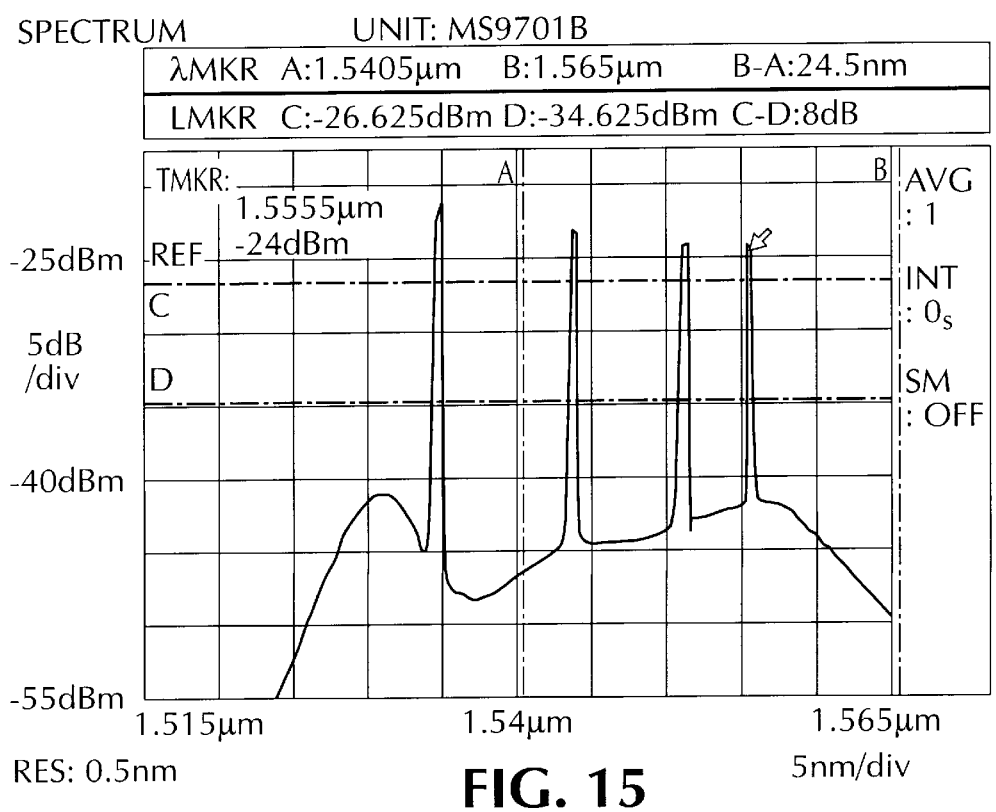
Figure 16:
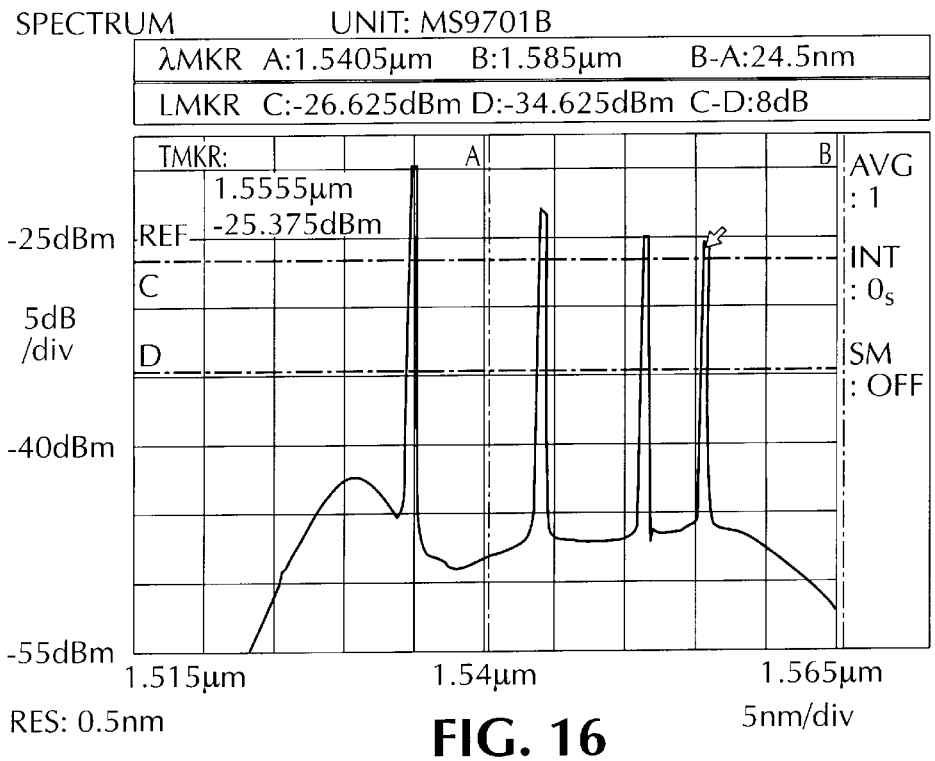
Figure 17:
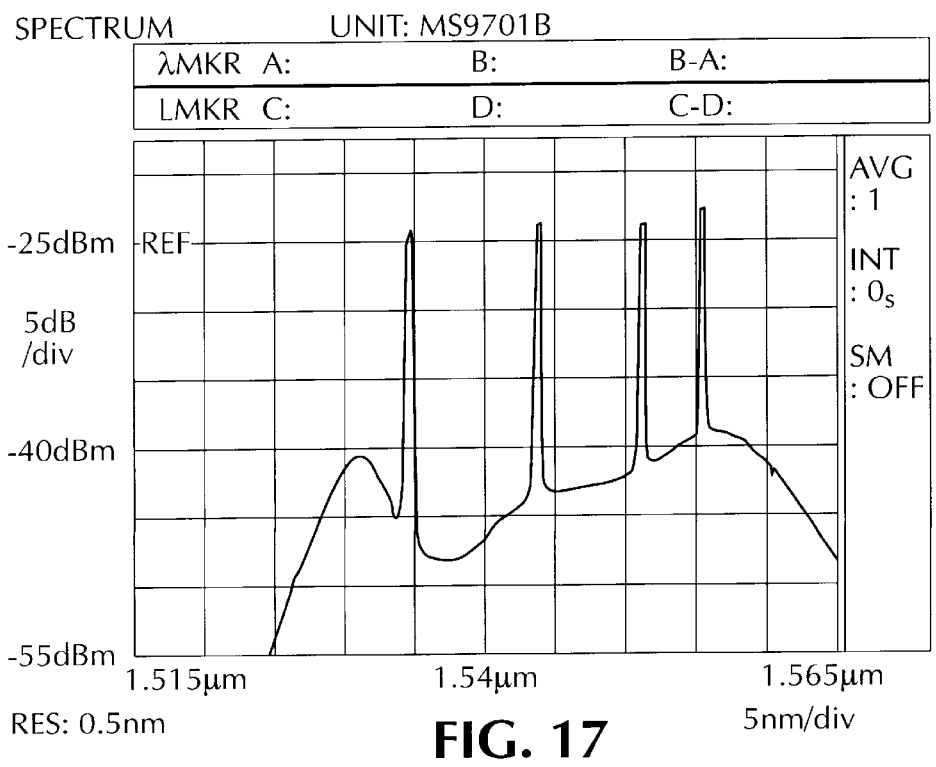
Figure 18:
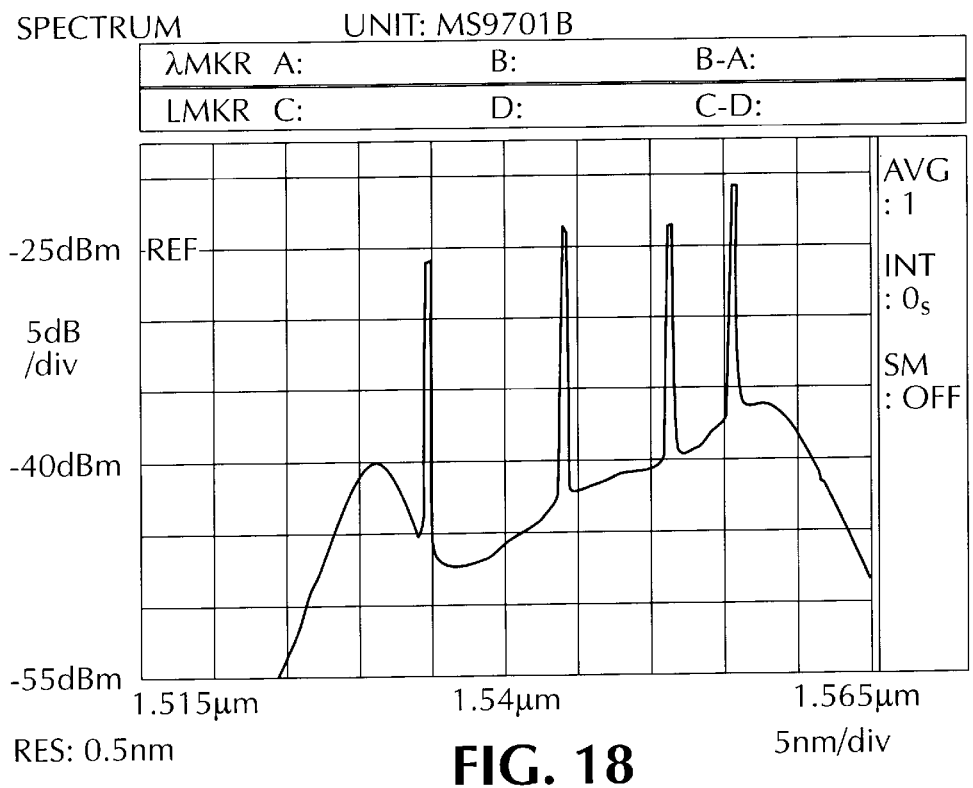
Figure 19:
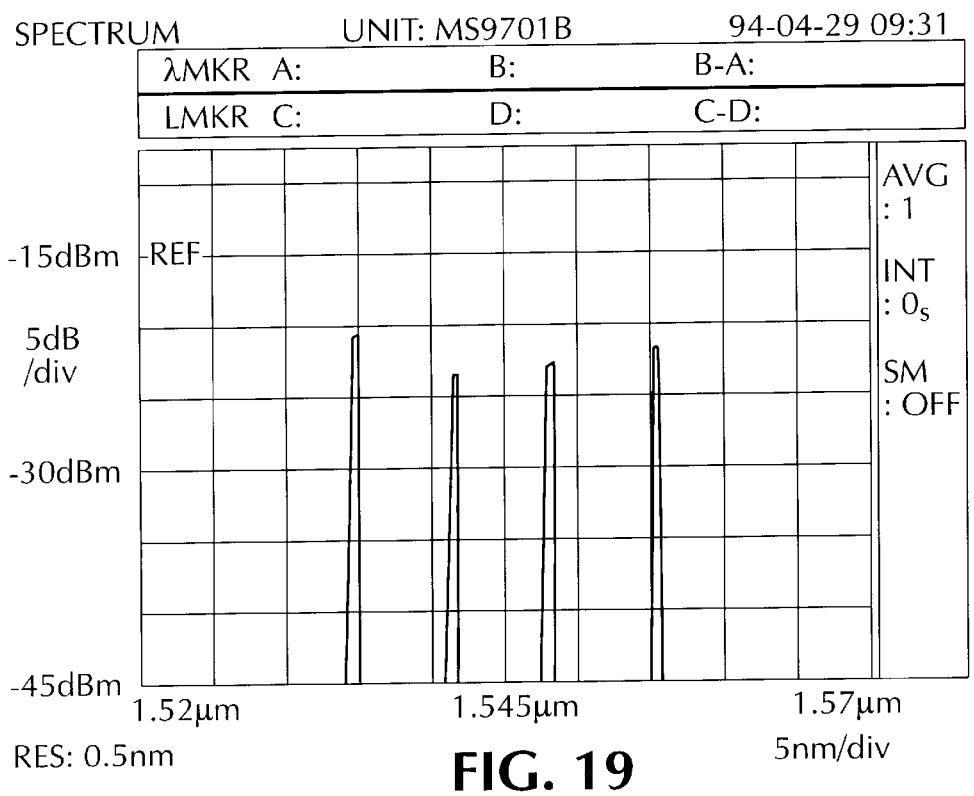
FIGS. 19 to 23 show the signal power levels in the subsequent amplification stages in an experiment in which amplifiers according to the known art are used.
Figure 20:
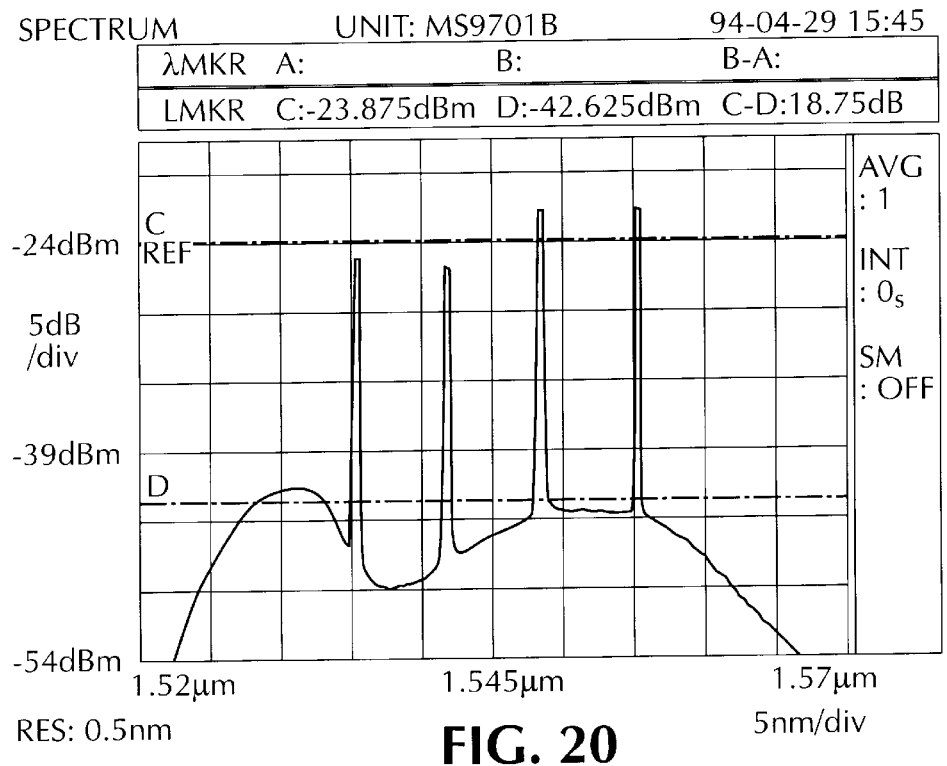
Figure 21:
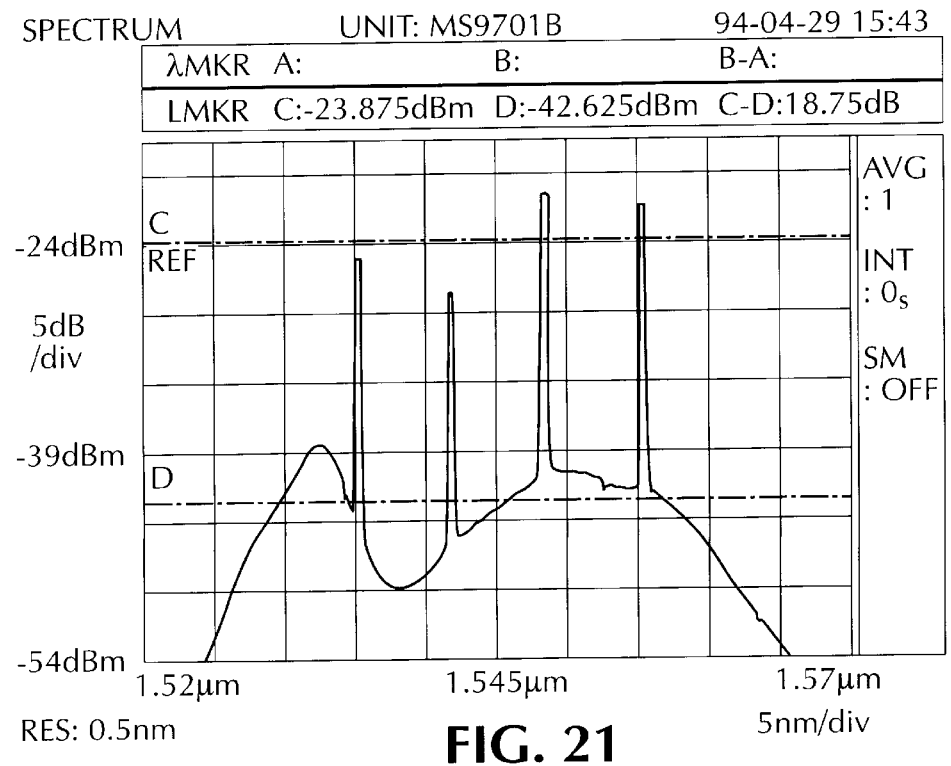
Figure 22:
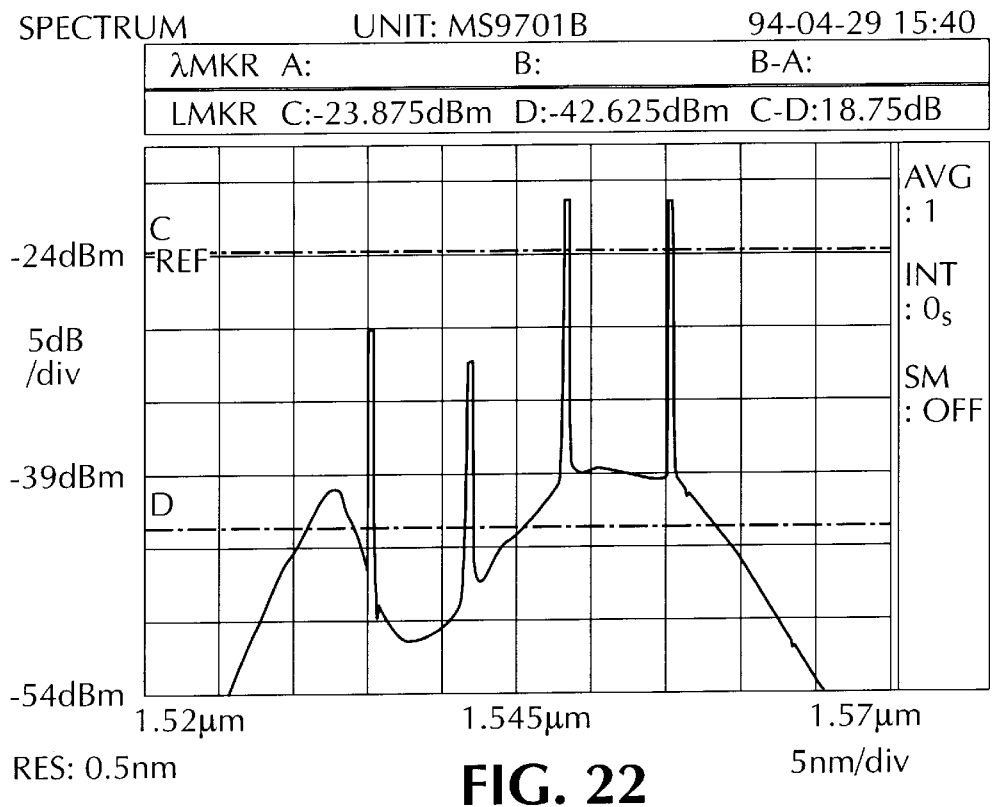

FIGS. 6, 17 and 18 respectively represent the signal spectrum at the line amplifier 7a input (FIG. 15), at the line amplifier 7b input (FIG. 16), at the line amplifier 7c input (FIG. 17), at the line amplifier 7d input (FIG. 18), and at the preamplifier 9 input (FIG. 18).

The pre-equalizer applied an initial maximum pre-equalization of approximately 7 dB between the different channels, as shown in FIG. 14. This pre-equalization aimed to compensate for the saturation effects at the shorter wavelengths occurring in cascade amplifiers.

The pre-equalization was carried out so as to equalize the optical signal/noise ratios (SNR) at the pre-amplifier 9 output.

In the different amplification stages, it is possible to see a reduction in the gain curve in the region of a shorter wavelength, due to the above described saturation phenomenon, whereas the optical signal/noise ratio (SNR) of each of the channels keeps high (SNR$\geq$15 dB with $\Delta\lambda=0.5$ nm) until the pre-amplifier 9 input.

This performance appears acceptable under the described experimental conditions. However since a pre-equalization of the signals is required, the system is made responsive to input signal variation. In particular, if one of them should be missing, an imbalance would occur due to the phenomenon of the gain competition in the line amplifier fibres, for the fact that the homogeneous-emission effect would prevail in the erbium fibres under examination.

In short, according to the gain competition phenomenon, the presence of a signal at a given wavelength in the fibre subtracts pumping energy to the signals fed to the other wavelengths, thereby affecting the gain thereof. As one of said signals fails, the available power is distributed among the other signals present therein thereby affecting gain.

Then, since pre-equalization was carried out for the four channels altogether, it is no longer valid and can produce effects increasing, instead of decreasing, the imbalances between the different channels.

Moreover, in the absence of pre-equalization, the signal-noise ratio at the reception, for some channels substantially <12 dB, would have been unacceptable.

EXPERIMENT 3

Experiment 3 was conducted in the absence of signal pre-equalization, with an amplifier provided with a notch filter, according to the diagram shown in FIG. 4, a fibre of type C being used.

Figure 23:
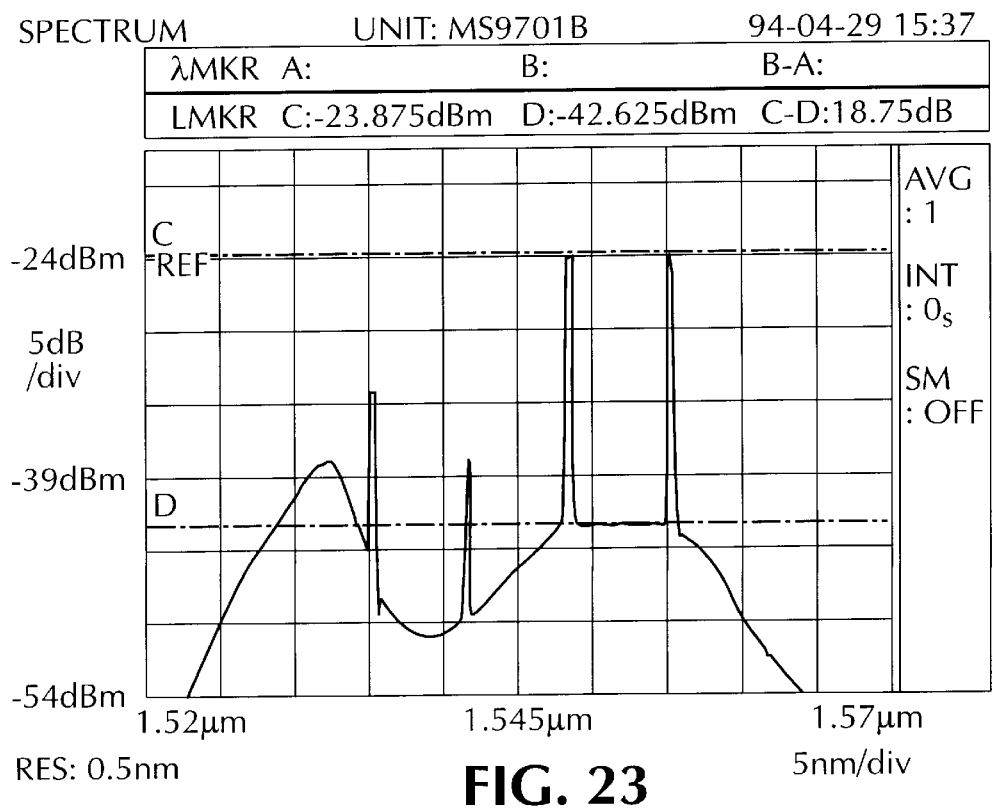

FIGS. 19, 20, 21, 22 and 23 respectively show the signal spectrum at the line amplifier 7a input (FIG. 19), at the line amplifier 7b input (FIG. 20), at the line amplifier 7c input (FIG. 21), at the line amplifier 7d input (FIG. 22) and at the pre-amplifier 9 input (FIG. 23).

At the pre-amplifier input, the optical signal/noise ratios for the different channels (over an optical band of 0.5 nm of the filter of the spectrum analyzer) were measured. The results are as follows:

| Wavelength nm | Signal/noise ratio (SNR) dB |
|---|---|
| $\lambda_1$ | 11.9 |
| $\lambda_2$ | 10.6 |
| $\lambda_3$ | 18.4 |
| $\lambda_4$ | 18.2 |

As can be noticed, there is a very high imbalance among the channels in terms of SNR. The most favoured channel differs more than 7 dB from the most unfavoured one. In addition for two of said channels, the signal/noise ratio was much lower than the value of 14 dB, and therefore insufficient to give an error level (BER) of $10^{-12}$. Such a high imbalance could not be compensated for by a pre-equalization.

From the preceding experiments, it is noted that fibre A is capable by itself of enabling the accomplishment of amplifiers suitable for wavelength multiplexing transmission, by avoiding one or more channels being penalized to an unacceptable degree, whereas fibre C is unable to provide the same performance.

In addition, as can be seen from a comparison between experiment 1 and experiment 2, the length variation in the active fibre, in particular the active fibre of the second amplification stage, has lead to the obtaining of amplifiers capable of operating in cascade under substantially uniform gain conditions at the different wavelengths, in particular in the absence of penalizations for channels included between 1535 and 1540 nm, without requiring pre-equalizations or external signal equalizing interventions at the reception, thereby offering an optical signal/noise ratio of high value.

It was noticed in fact that there is a critical length value for the active fibre in the amplifier that is provided for wavelength multiplexing transmission with several amplifiers in cascade, at which value a uniform response for the different channels can be obtained, whereas for different length values of the active fibre, one or more of the supplied wavelengths, in particular at the ends of the desired work band, appear to be subjected to gain restrictions. In addition, such critical length value unexpectedly appears to greatly differ from the preferred value for an amplifier sized for a single use.

e) Optimal fibre length in the amplifier

The optimal amplifying fibre length for an amplifier intended for single use is usually identified by experimentally finding out the length at which there is the maximum output power (for a given pumping power), under small signal conditions (that is, in the absence of saturation phenomena).

Figure 24:
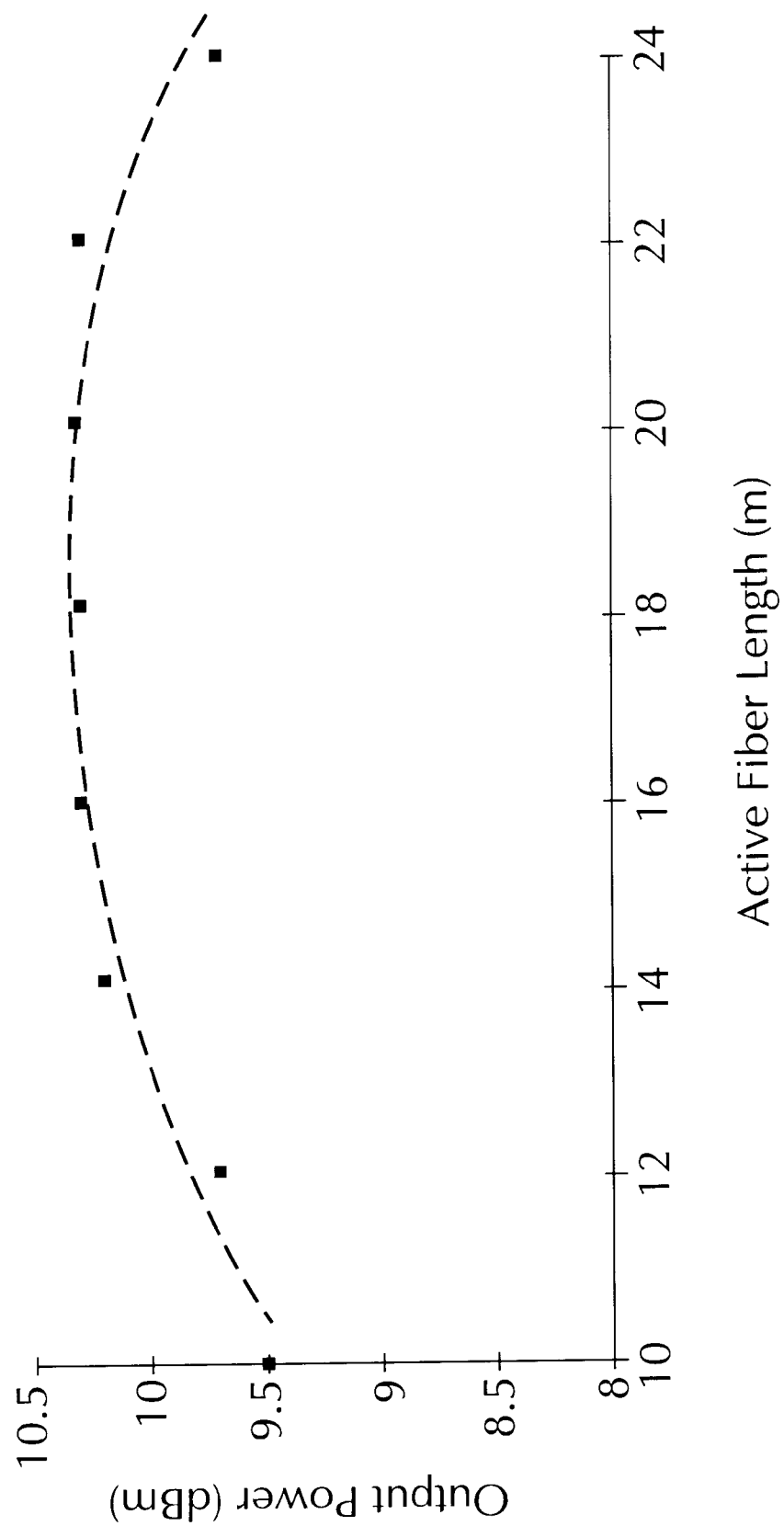
FIG. 24 is a qualitative representation of the optimal selection conditions for an active fibre length in a line amplifier.

For example, FIG. 24 reproduces the efficiency curve showing the output power depending on the fibre length of the second stage of the amplifier in the previously described example. The curve was obtained by experimentation with a unit comprising an active fibre portion, of which several lengths were tried. The fibres were fed with an input power signal of −20 dBm at λ=1557 nm, and pumped with a laser diode of a pumping power of 80 mW (the same pumping power as provided for the corresponding stage in the line amplifier).

As can be seen from this curve, there is a rather wide range of fibre length within which a high output power value exists. An appropriate length value within this range can be identified, just as an indication, between 15 and 20 m.

The use of an amplifier sized as such, however, as experiments 2 and 3 show, does not enable a satisfactory behaviour to be achieved in the case of cascaded amplifiers in a multi-wavelength system.

However, in accordance with the present invention, it has been found that by selecting a different length value of active fibre, and in particular less than the value deemed as the optimal one for the single-use amplifier, the results are greatly improved and a multi-wavelength communication can he made without using signal pre-equalizations.

Figure 25:
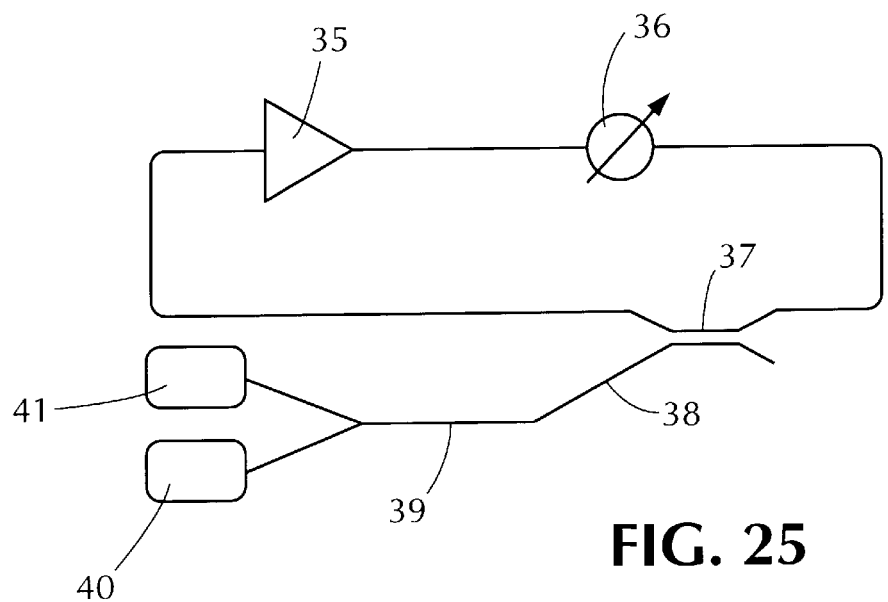
FIG. 25 is a diagram of an apparatus for determining the optimal active fibre length in line amplifiers.

For the purpose of identifying the optimal active fibre length, a test amplifier 35 is introduced into the experimental structure shown in FIG. 25.

The amplifier 35 is disposed in an optical fibre ring including an optical attenuator 36 offering an adjustable attenuation, and a directional coupler 37 having a 50/50 division ratio at 1550 nm. Such a structure forms a ring laser, the emission of which is extracted from branch 38 of the coupler 37.

The emission extracted from the branch 38 can be sent, through a respective optical fibre 39, to a power meter 40 and an optical spectrum analyzer 41.

The test is carried out as follows.

Once the test bed is set, the output from the coupler is first connected to the power meter 40. Then the amplifier is operated (that is pump power is supplied to the respective active fibre or fibres) and the attenuation given from the variable attenuator 36 is caused to vary progressively as far as an output power value corresponding to the value for which the amplifier is provided is detected by the power meter 40.

Fibre 39 is then connected to the spectrum analyzer 41. The resulting spectrum is shown for different lengths of active fibre, in FIGS. 26, 27, and 28 relating to tests carried out with the previously described line amplifier, for three different lengths of the second-stage fibre, that is 10, 11, 12 meters respectively. As a result, since losses introduced into the ring from the attenuator 36 and coupler 37 are lower than the maximum gain of the fibre of the amplifier being tested, the amplifier tends to oscillate, thereby giving rise to a laser emission in those spectral regions possessing the maximum gain value.

Different length values of the active fibre cause a region to prevail over another.

Figure 26:
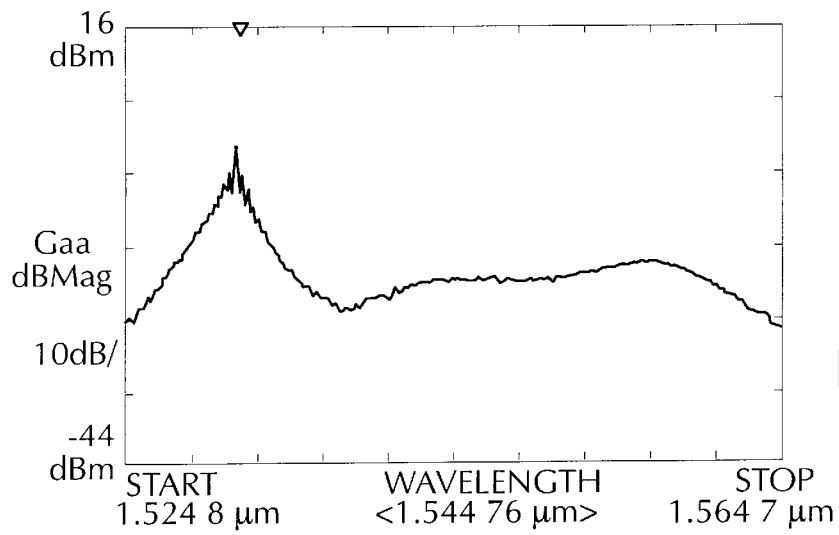
FIG. 26 is an emission spectrum of the apparatus shown in FIG. 25 in the case of an insufficient fibre length.

In the case shown in FIG. 26 (a too short fibre, approximately 10 m in the example), the system has a stable emission with a low-wavelength peak (λ=about 1531 nm). In the case shown in FIG. 28 (a too long fibre, about 12 m in the example), the system has a stable emission with a high-wavelength peak (λ=about 1557 nm).

Figure 27:
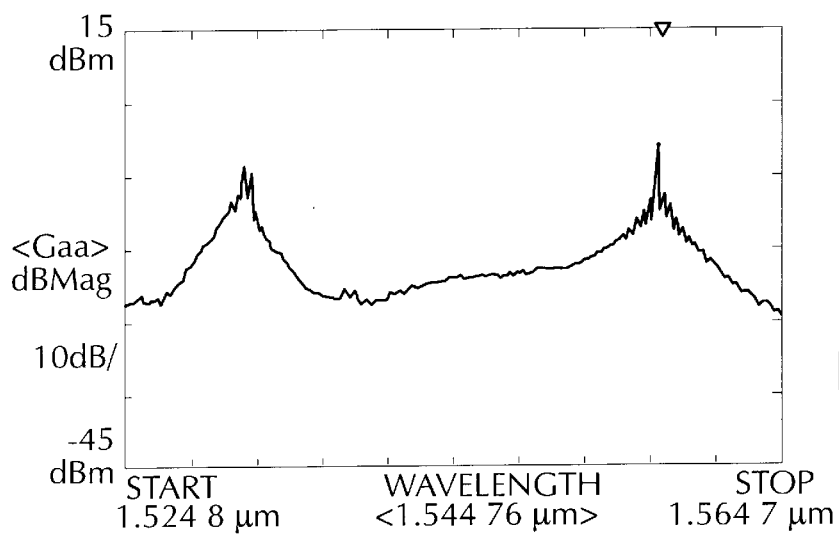
FIG. 27 is an emission spectrum of the apparatus shown in FIG. 25 in the case of an optimal fibre length.
Figure 28:
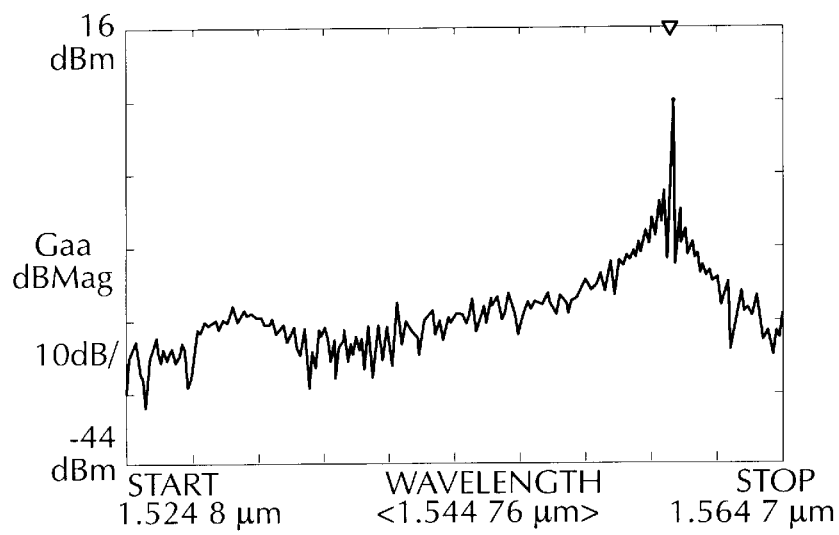
FIG. 28 is the emission spectrum of the apparatus shown in FIG. 25, in the case of an excessive fibre length.

Through the execution of several tests, starting for example from a "long" fibre and shortening it progressively, the situation shown in FIG. 27 (corresponding to an active fibre about 11 m long) can be reached in which the emission spectrum exhibits two stable peaks, substantially of same height, both at a low and at a high wavelength.

Such a condition corresponds to a fibre length adapted to ensure a transmission over several wavelengths with cascade amplifiers, keeping the equalization between the different channels.

It will be noted that the emission condition of two stable peaks can take place even with different values of fibre length, but it could be observed, however, that such a condition is unambiguous for the purpose of determining the optimal length of an active fibre in the amplifier for a cascade operation over several wavelengths, when the operating conditions of the amplifier itself are fixed, in particular the output power of same.

When the output power substantially corresponds to the work power provided for the amplifier, the fibre length giving rise to the two stable peaks is that suitable for application in the cascaded multi-wavelength system.

An accuracy in determining the fibre length in the range of approximately 0.5 m, in the case of the previously mentioned fibre type, is considered as sufficient for the described application. Similar considerations apply to the work power of the amplifier.

Due consideration must be paid to the fact that, during the useful lifetime of the amplifier and the system in which said amplifier is inserted, phenomena of different nature may reduce the power of the signals entering the amplifier or amplifiers, for example as a result of increases in the attenuation of the transmitted signals and therefore reduce the work power in the line amplifiers themselves, thereby modifying the operating features and final performance of same at the receiving station.

For example, if the determination of the optimal fibre length is carried out with reference to an optical input power to the amplifier of −16 dBm (or higher), corresponding to an output power of about 14 dBm with an overall gain of about 30 dB, the signal/noise ratio obtained at the receiver is better than 15 dB, as long as conditions in the line remain unchanged. As the input power to the line amplifiers decreases during the lifetime of the transmission system, for example as a result of decay phenomena in the optical fibres or other components, for example until the value of −18 dBm, the signal/noise ratio at the reception will be lower, although still greater than 13 dB, which is sufficient to give a BER value of $10^{-12}$.

It is to be pointed out that the presence of one or more amplifiers in the line in which the optical input power is lower than a given value can affect the system performance as a whole, and be the cause of a local noise increment that has repercussions at the receiving station.

It is noted that the length found out in such a test is much less than the length that would be deemed appropriate in case of tests based on the analysis of a single amplifier passed through by a signal only once. In the example, the fibre length detected by means of the last-mentioned test (about 11 meters) was about 30% less than the minimum value resulting from only finding out the length of the maximum amplification gain (15–20 m).

The best results achieved with the use of amplifiers with a fibre length determined as above specified are deemed to be due to the fact that efficiency determinations and tests based on a single amplifier, passed through by an optical signal in a single passage, cannot show the phenomena occurring when the signal passes through several cascaded units, in which any signal non-equalizations tend to become increasingly more apparent. The above described test, on the contrary, enables the determination of a fibre length in the amplifier, which is capable of achieving equalized operation in passing signals through several amplifiers.

It is pointed out that the optimal active-fibre length in the amplifier, for the purposes of the present invention, depends on several parameters, among which are the erbium content in the fibre and the power of the signal passing through the amplifier. The above described test, however, enables the optimal fibre length for the specific structure of the amplifier under examination to be identified. This enables the establishment of a value in which the specific features of the amplifier are already taken into account.

In case of variations in the amplifier features, such as, for example, a different erbium content in the fibre (usually identified as a fibre attenuation at the signal wavelength), the value of the optimal fibre length for cascaded operation in a multi-wavelength system as described may need to be verified again.

A hypothesis for interpreting the observed phenomenon is based on the fact that, due to the emission features of erbium, lower wavelengths (for example 1530–1535 nm in a Si/Ge/Al/La/Er system) exhibit a high small signal gain, so that a low-wavelength $\lambda_b$ signal, after a relatively short fibre length $l_1$, reaches a power value causing saturation conditions in the amplifier.

Such saturation conditions (in which the output power of the signal does not substantially depend any longer on its input power) are maintained in the fibre until the pumping power remains in the fibre at a sufficiently high value, that is until a length $l_2$, beyond which the pump power in the fibre is insufficient to ensure an amplification and the signal begins to be attenuated, due to the three-level energy nature of the system of emission of erbium incorporated into the fibre as the dopant.

A signal at a high wavelength $\lambda_a$, to the contrary, operates in a zone of the erbium spectrum in which there is a lower gain, so that it reaches a saturation power after a fibre length $l_3$ greater than $l_1$.

In the same manner as above described, the saturation state is maintained until a fibre length value $l_4$ greater than $l_3$.

Thus, the condition of a uniform response for the different channels (that is for all different wavelengths multiplexed and fed to the amplifier) occurs for an overall length of active fibre in the amplifier (both of the one-stage and multi-stage type) which is sufficiently high to enable signals at the highest wavelengths to have already reached the maximum gain, but not so high to enable the signals at the lowest wavelengths to start attenuating, due to an insufficient pump power in the end portion of the fibre.

The intermediate wavelengths between $\lambda_b$ and $\lambda_a$ will have a behaviour included therebetween and therefore the detected fibre length is suitable for them too.

In the previously described examples, reference is made to amplifiers of the two-stage type. In said examples the optimal fibre length in the amplifier was selected by setting, based on the above considerations of maximum gain, the length of the fibre employed in the first stage and then determining the optimal fibre length in the amplifier by modifying the length of the second stage alone, during a test in which the whole amplifier (that is the two-stages and the related pumping means included) is connected in the test ring.

The above considerations, however, also refer to single-stage amplifiers, that is amplifiers using a single active fibre portion with the related pumping means, for which the selection of the optimal length is carried out on the only fibre.

While in the case of a multi-stage amplifier the establishment of the optimal fibre length is preferentially carried out, for the intended purposes, by testing the whole amplifier in the described experimental structure and selecting the fibre length of one of said stages alone, more preferentially the output one, for some applications however, it is also possible, following the above technique, to establish the fibre length of each of the amplification stages, or one or more of them appearing critical as far as the required transmissive performance is concerned, by means of specific tests on the stage or stages of interest tested separately.

The choice between two-stage/multi-stage amplifiers and single-stage amplifiers can be made based on the particular requirements of the application, for example, in relation to the type and power of the employed pump lasers and the operating conditions selected for them.

For example, the configuration providing two separately pumped stages can be convenient when the use of two pump lasers operating at reduced powers is wished.

Alternatively, in amplifiers requiring relatively low pump power levels, or when a single pump laser at a high power emission (100 mW for example) is available, a configuration providing a single amplification stage can be adopted.

As a further alternative, a bilateral-pumping amplifier may be also adopted.

At all events, for operating multiple cascaded amplifiers in a multi-wavelength system, the active fibre length may be conveniently selected based on criteria defined within the scope of the present invention.

According to another aspect of the present invention, in addition, a transmission system in accordance with the invention appears to be particularly advantageous for the purpose of making an optical connection of high quality that is insensitive to the number of the transmitted channels.

In addition, the number of channels can be incremented without expensive interventions being required on the already installed line apparatus, by merely adapting the transmitting and receiving units thereto.

For example, it is possible to implement a system according to the diagram shown in FIG. 1, that comprises the interfacing units and multi-wavelength line amplifiers, by initially providing a single channel, with a rise in costs in the order of 10% with respect to a solution of the traditional type, devoid of an interfacing unit and equipped with amplifiers provided for operation at a single wavelength.

Such a system, however, can be subsequently developed, for transmission on four channels for example, that is with a transmissive capability multiplied by four, by adding the necessary interfacing units alone at the transmitting and receiving stations. This will involve a cost for the development on the same order as the initial investment. For a system of the traditional type, on the contrary, the same type of development would require a new dedicated line including respective amplifiers and cables for every new intended channel, which will bring about a cost for development to four channels, corresponding to approximately four times the starting investment, in addition to the laying costs for the new necessary cables and the arising of problems correlated with the necessity of operating along the whole connecting line.

In accordance with the present invention, in fact, the part of the system involving the highest costs appears to be completely insensitive to the number of channels transmitted at different wavelengths and therefore does not require updating or further modifications in order to cope with greater transmission requirements. Further, the use of the interfacing units of the described type enables the requested number of channels with the most appropriate features for operation within the system to be supplied to the line.

I claim:

1. An incrementable multi-wavelength optical communication system comprising:
    a transmission station comprising an optical transmitting adapter configured to receive an information-bearing external optical signal and generate a transmission optical signal containing the external optical signal information, the transmission optical signal having a first work wavelength selected from a plurality of predetermined work wavelengths, said transmission station also comprising an optical combiner for combining into a single optical fiber said transmission signal and at least an optical signal at a second work wavelength selected from said plurality of predetermined work wavelengths and different from said first work wavelength;
    a receiving station comprising an optical receiving element configured to receive an optical signal at said first work wavelength;
    an optical fiber line connecting said transmitting and receiving stations for transmitting said transmission optical signal from said transmitting station to said receiving station, said optical fiber line comprising at least one optical amplifier for amplifying optical signals in a work band including said plurality of work wavelengths, said amplifier comprising a length of rare earth doped active fiber and a pump supply coupled to the active fiber, said amplifier providing uniform amplification in said work band; and
    wherein the optical transmitting adapter comprises:
        a photodetector for converting said external optical signal into an electric signal;
        a laser for emitting a light signal at said first work wavelength; and
        an external modulator controlled by said electric signal for modulating the light signal emitted by said laser.

2. The system of claim 1, wherein said optical fiber line comprises a plurality of cascaded optical amplifiers, said cascaded amplifiers providing uniform amplification in said work band.

3. The system of claim 1, wherein said work band has a width of at least 20 nm.

4. The system of claim 1, wherein said transmission station comprises four optical transmitting adapters.

5. The system of claim 1, wherein the optical amplifier comprises at least one erbium-doped active fiber.

6. An expandable multi-wavelength optical communication system for carrying a plurality of multiplexed optical wavelengths, said system comprising:
    a transmission station comprising a plurality of optical transmitting adapters, each transmitting adapter being configured to receive an information-bearing external optical signal and generate a transmission optical signal containing the external optical signal information, the transmission optical signal having a work wavelength selected from a plurality of predetermined work wavelengths, said transmission station also comprising an optical combiner for combining said transmission signals into a single optical fiber;
    a receiving station comprising a plurality of optical receiving elements, each receiving element being configured to receive an optical signal at one of said work wavelengths;
    an optical fiber line connecting said transmitting and receiving stations for simultaneously transmitting said transmission optical signals from said transmitting station to said receiving station, said optical fiber line comprising a plurality of cascaded optical amplifiers for amplifying optical signals in a work band including said plurality of work wavelengths, each said amplifier comprising a length of rare earth doped active fiber and a pump supply coupled to the active fiber; and wherein each of the optical transmitting adapters comprises:
- a photodetector for converting an external optical signal into an electric signal;
- a laser for emitting a light signal at one of said work wavelengths; and
- an external modulator controlled by said electric signal for modulating the light signal emitted by said laser.

7. The system of claim 6, wherein said cascaded amplifiers provide uniform gain in said work band.

8. The system of claim 6, wherein said receiving station further comprises a demultiplexer for separating the transmission signals received from said optical fiber line according to their wavelengths.

9. The system of claim 8, wherein said demultiplexer comprises a fiber splitter and at least one bandpass filter.

10. An expandable multi-wavelength optical communication system for carrying a plurality of multiplexed optical wavelengths, said system comprising:
- a transmission station comprising a plurality of optical transmitting adapters, each transmitting adapter being configured to receive an information-bearing external optical signal and generate a transmission optical signal containing the external optical signal information, the transmission optical signal having a work wavelength selected from a plurality of predetermined work wavelengths, said transmission station also comprising an optical combiner for combining said transmission signals into a single optical fiber;
- a receiving station comprising a plurality of optical receiving elements, each receiving element being configured to receive an optical signal at one of said work wavelengths;
- an optical fiber line connecting said transmitting and receiving stations for simultaneously transmitting said transmission optical signals from said transmitting station to said receiving station, said optical fiber line comprising a plurality of cascaded optical amplifiers for amplifying optical signals in a work band including said plurality of work wavelengths, each said amplifier comprising a length of rare earth doped active fiber and a pump supply coupled to the active fiber, said cascaded amplifiers providing uniform amplification in said work band; and
- wherein each of the optical transmitting adapters comprises:
  - a photodetector for converting an external optical signal into an electric signal; and
  - a modulated laser emitter controlled by said electrical signal for emitting a light signal at one of said work wavelengths.

11. The system of claim 10, wherein each of said optical transmitting adapters further comprises a circuit for controlling an emission wavelength of said modulated laser emitter and for keeping the emission wavelength at one of said work wavelengths.

12. The system of claim 10, wherein each of said modulated laser emitters comprises a laser for emitting a continuous light signal at one of said work wavelengths and an external modulator controlled by said electric signal for modulating said continuous light signal.

* * * * *

UNITED STATES PATENT AND TRADEMARK OFFICE
CERTIFICATE OF CORRECTION

PATENT NO. : 6,025,954
DATED : February 15, 2000
INVENTOR(S) : Meli et al

It is certified that error appears in the above-identified patent and that said Letters Patent is hereby corrected as shown below:

Col. 2, line 52, change "$AlO_3$" to --$Al_2O_3$--;

Col. 11, Table 1, under "NA" change "10.20" to --0.20--;

Col. 11, line 60, change "$nl^2-n^2)^{1/2}$ to --$nl^2-n2^2)^{1/2}$;

Col. 14, line 23, change "6, 17 and 18" to --15, 16, 17 and 18--.

Signed and Sealed this

Twelfth Day of December, 2000

Attest:

Attesting Officer

Q. TODD DICKINSON
Director of Patents and Trademarks